(12) United States Patent
Chao

(10) Patent No.: US 11,396,984 B1
(45) Date of Patent: Jul. 26, 2022

(54) DEPLOYABLE LIGHTING SYSTEM WITH DEVICE SUPPORT

(71) Applicant: Hen-Li Philip Chao, Livingston, NJ (US)

(72) Inventor: Hen-Li Philip Chao, Livingston, NJ (US)

(73) Assignee: Vitec Imaging Solutions S.P.A., Cassola (IT)

( * ) Notice: Subject to any disclaimer, the term of this patent is extended or adjusted under 35 U.S.C. 154(b) by 0 days.

(21) Appl. No.: 17/463,550

(22) Filed: Sep. 1, 2021

Related U.S. Application Data

(60) Provisional application No. 63/169,879, filed on Apr. 2, 2021.

(51) Int. Cl.
| | | |
|---|---|---|
| *F21L 4/04* | (2006.01) | |
| *F21L 4/02* | (2006.01) | |
| *F21V 17/00* | (2006.01) | |
| *F21V 21/088* | (2006.01) | |
| *F21V 21/26* | (2006.01) | |

(52) U.S. Cl.
CPC ............ *F21L 4/04* (2013.01); *F21L 4/02* (2013.01); *F21V 17/007* (2013.01); *F21V 21/0885* (2013.01); *F21V 21/26* (2013.01)

(58) Field of Classification Search
CPC .... F21L 4/04; F21L 4/02; H04M 1/22; G03B 2215/0575; G03B 15/03; G03B 15/06; G03B 15/05; G03B 15/07; F21V 21/088; F21V 21/0885; F21V 21/26; F21V 21/30; F21V 17/007; F21V 17/02
See application file for complete search history.

(56) References Cited

U.S. PATENT DOCUMENTS

| | | | | |
|---|---|---|---|---|
| 7,131,753 B1* | 11/2006 | Edwards, Jr. | ........... | F21S 2/005 362/225 |
| 2005/0018435 A1* | 1/2005 | Selkee | ................ | F21V 33/0076 362/240 |
| 2009/0135611 A1* | 5/2009 | Lin | ........................... | F21L 4/04 362/372 |
| 2010/0039801 A1* | 2/2010 | Pelletier | .................... | F21L 2/00 362/184 |
| 2011/0298351 A1* | 12/2011 | Han | ......................... | F21K 9/23 313/46 |
| 2012/0243200 A1* | 9/2012 | Sutton | .................... | G03B 15/02 362/11 |
| 2016/0277660 A1* | 9/2016 | Kaiser | ..................... | H04W 4/80 |
| 2017/0299151 A1* | 10/2017 | Luo | ..................... | F21V 19/0055 |

(Continued)

*Primary Examiner* — Alexander K Garlen
*Assistant Examiner* — James M Endo
(74) *Attorney, Agent, or Firm* — Michael A. Guth

(57) ABSTRACT

A deployable lighting system with device support adapted to allow a user to deploy lighting that may be used while recording or live-streaming video. The device support may be mounted upon a tripod, or other support, or may be self-supporting. The device support is adapted to support an electronic device, such as a cellular telephone, with a device clip. A deployable lighting system may be deployed which deploys from a compact, stowed, configuration to a deployed configuration in which a plurality of lights may surround the device clip. The deployable lighting system may take the shape of a ring light or a star light, such that a user doing self-video is well lit. The lighting system may allow for warmer or cooler tones to be selected from the lighting system.

19 Claims, 40 Drawing Sheets

(56) References Cited

U.S. PATENT DOCUMENTS

| | | | |
|---|---|---|---|
| 2017/0336056 A1* | 11/2017 | Fan | F21V 21/145 |
| 2018/0003338 A1* | 1/2018 | Scott | B25H 3/00 |
| 2018/0163957 A1* | 6/2018 | Zhou | F21V 21/06 |
| 2018/0224102 A1* | 8/2018 | Bian | F21L 4/045 |
| 2018/0238523 A1* | 8/2018 | Hudson | G03B 15/02 |
| 2018/0340661 A1* | 11/2018 | Inskeep | F21V 19/02 |
| 2019/0003699 A1* | 1/2019 | Mondora | A45D 42/10 |
| 2019/0346122 A1* | 11/2019 | Proeber | F21V 17/007 |
| 2020/0088400 A1* | 3/2020 | Li | F21V 23/0485 |

* cited by examiner

DEPLOYABLE LIGHTING SYSTEM WITH DEVICE SUPPORT

CROSS-REFERENCE TO RELATED APPLICATIONS

This application claims priority to U.S. Provisional Patent Application No. 63/169,879 to Chao, filed Apr. 2, 2021, which is hereby incorporated by reference in its entirety.

BACKGROUND

Field of the Invention

The present invention relates to accessories for an electronic device, and more particularly to a deployable light system with a device support.

Description of Related Art

The use of cellular telephones as platforms for video communications is ever increasing. As video communications increase, users may become more concerned about the lighting which illuminates them during the video session. In addition, a device support for the electronic device, which may be a cellular telephone, is increasingly important.

What is called for is a device support which can provide a secure way to hold the device, such as a cellular telephone, and which can provide enhanced lighting during video operations. What is also called for is a such a system which can be stowed into a compact configuration.

SUMMARY OF THE INVENTION

Figure 1A:
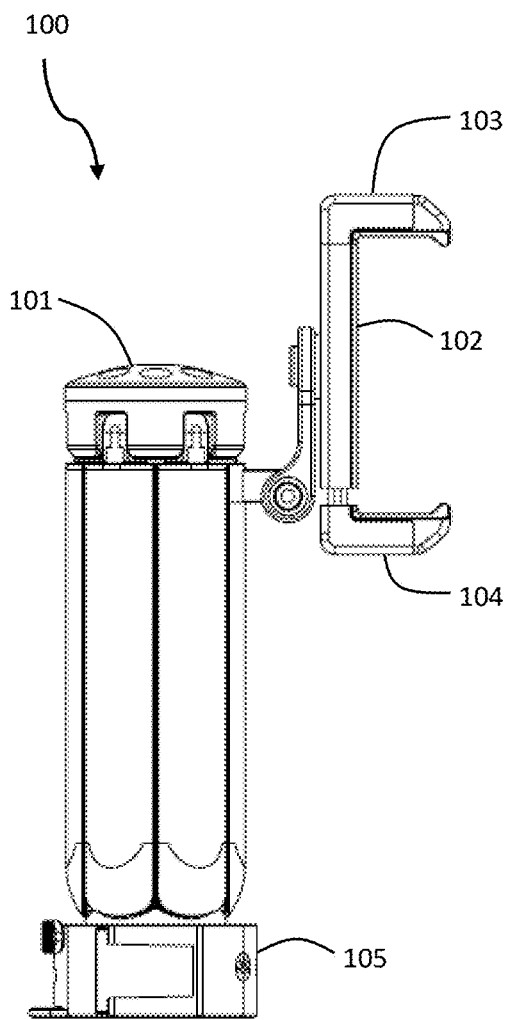
FIG. 1A is a side view of a deployable lighting system with device support in a stowed configuration according to a first embodiment of the present invention.
Figure 1B:
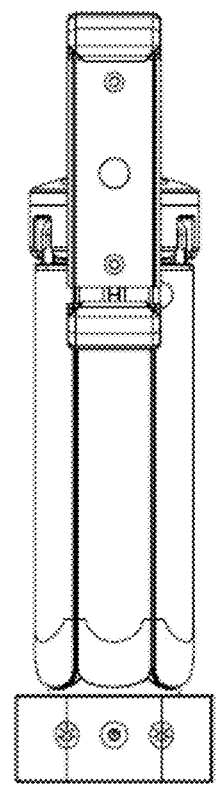
FIG. 1B is a front view of a deployable lighting system with device support in a stowed configuration according to a first embodiment of the present invention.
Figure 1C:
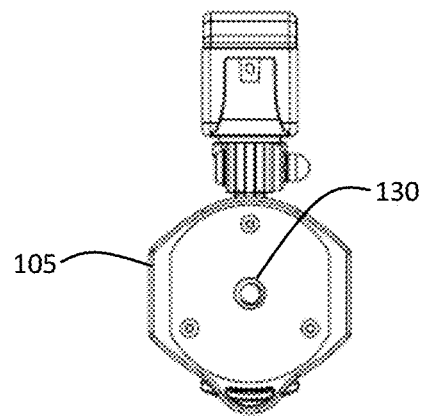
FIG. 1C is a bottom view of a deployable lighting system with device support in a stowed configuration according to a first embodiment of the present invention.
Figure 1D:
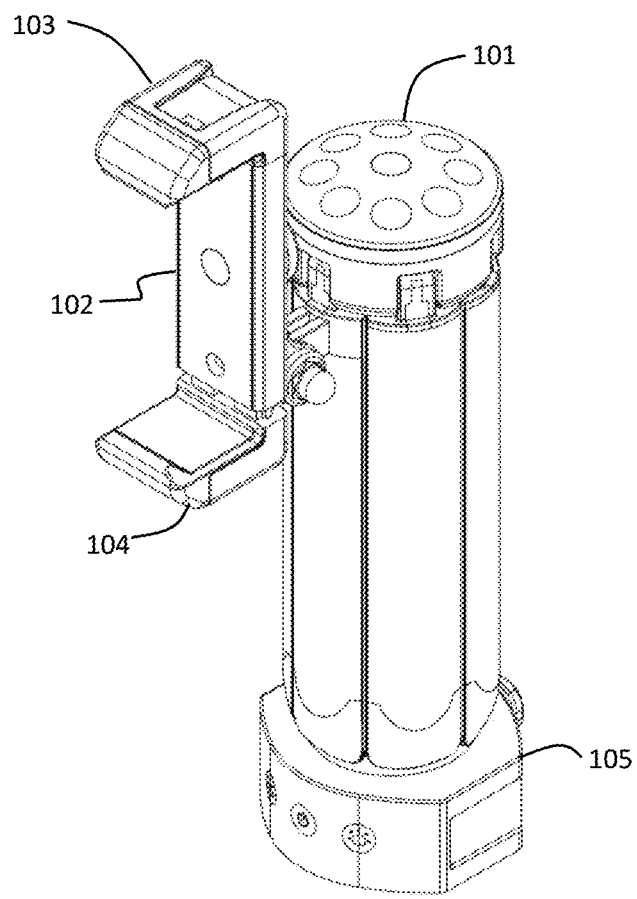
FIG. 1D is an oblique view of a deployable lighting system with device support in a stowed configuration according to a first embodiment of the present invention.
Figure 1E:
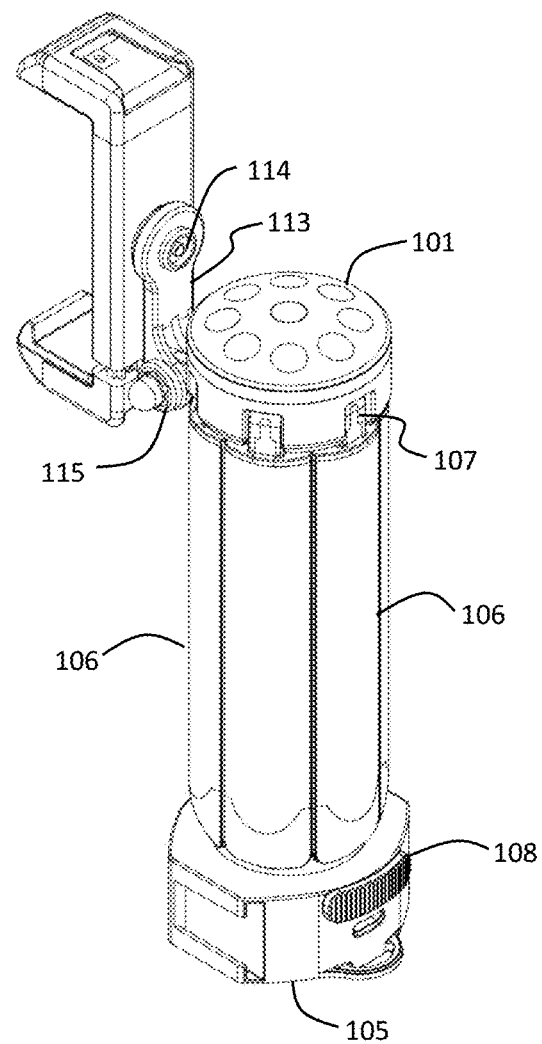
FIG. 1E is an oblique view of a deployable lighting system with device support in a stowed configuration according to a first embodiment of the present invention.
Figure 2A:
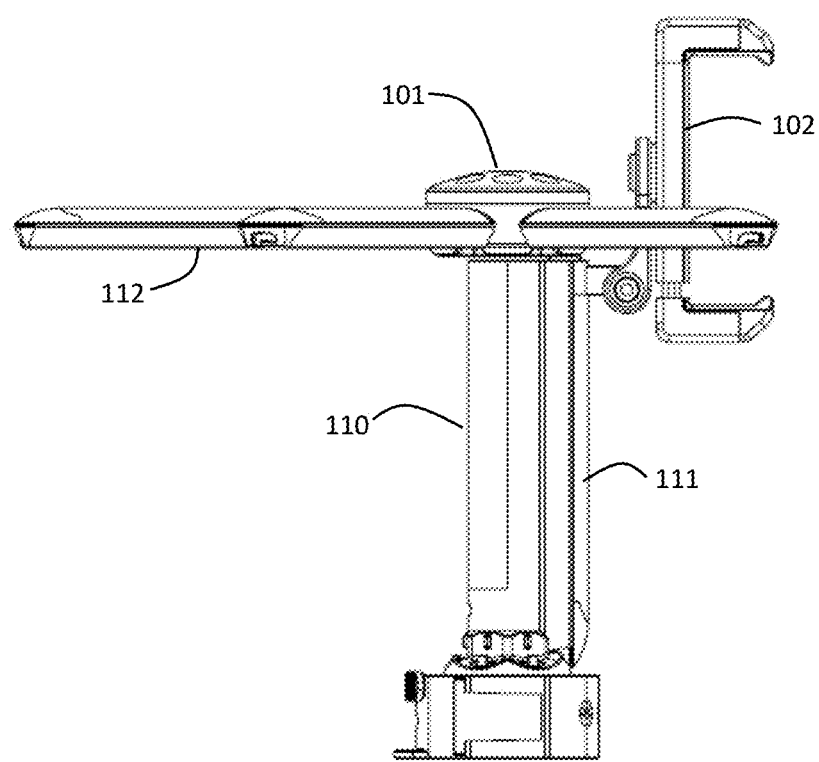
FIG. 2A is a side view of a deployable lighting system with device support in a partially deployed configuration according to a first embodiment of the present invention.
Figure 2B:
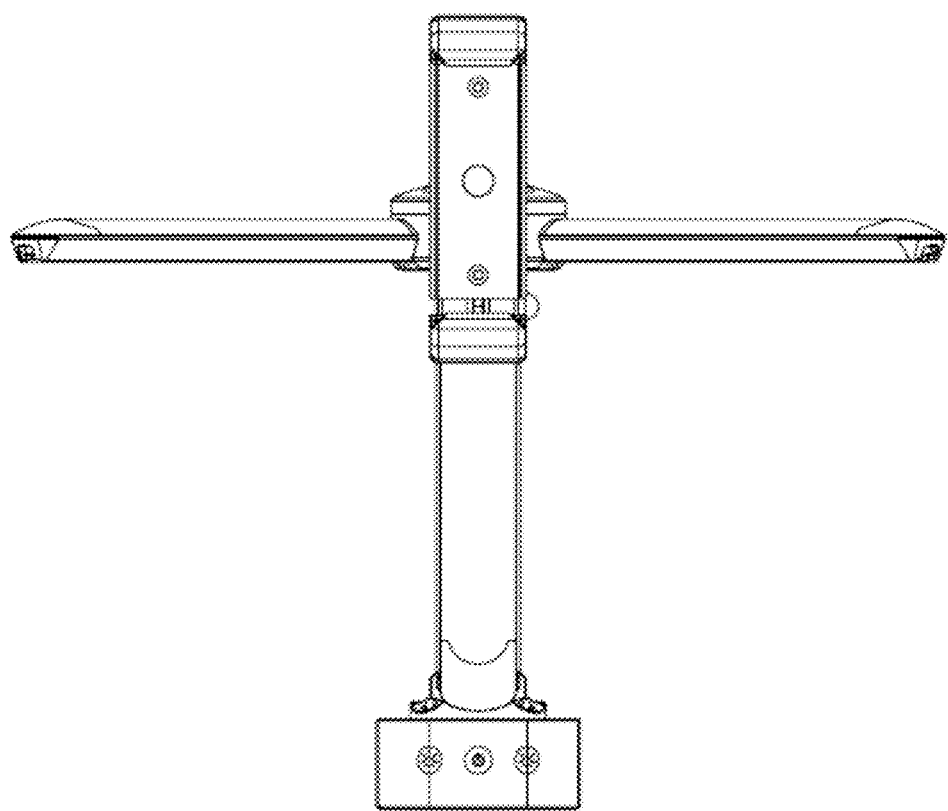
FIG. 2B is a front view of a deployable lighting system with device support in a partially deployed configuration according to a first embodiment of the present invention.
Figure 2C:
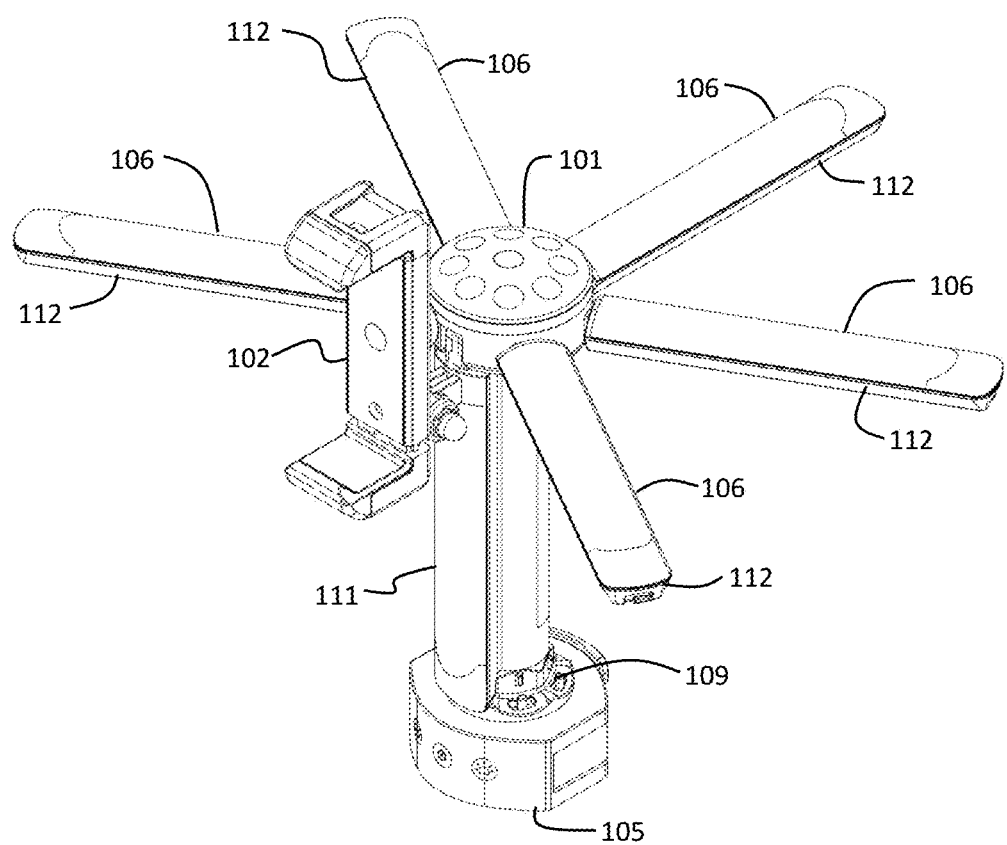
FIG. 2C is an oblique view of a deployable lighting system with device support in a partially deployed configuration according to a first embodiment of the present invention.
Figure 2D:
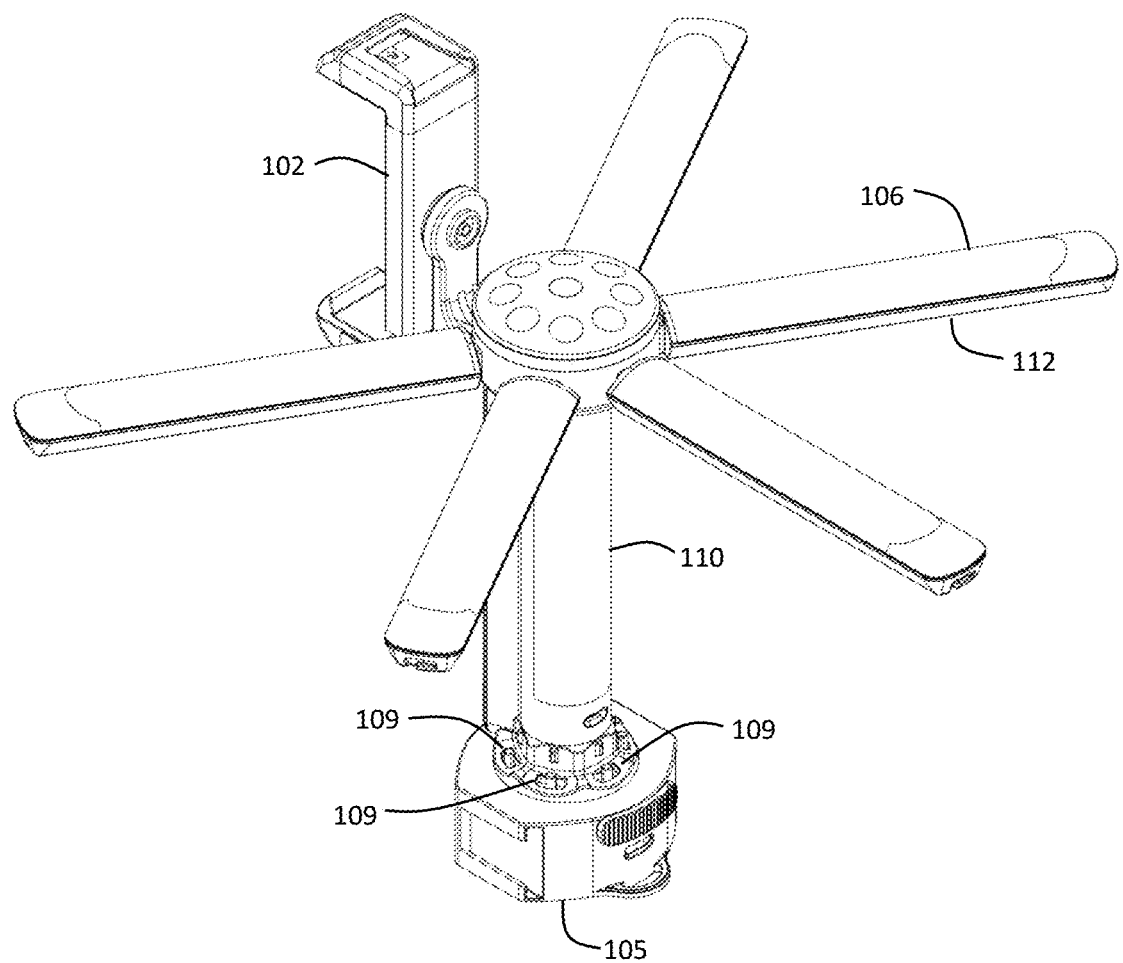
FIG. 2D is an oblique view of a deployable lighting system with device support in a partially deployed configuration according to a first embodiment of the present invention.
Figure 3A:
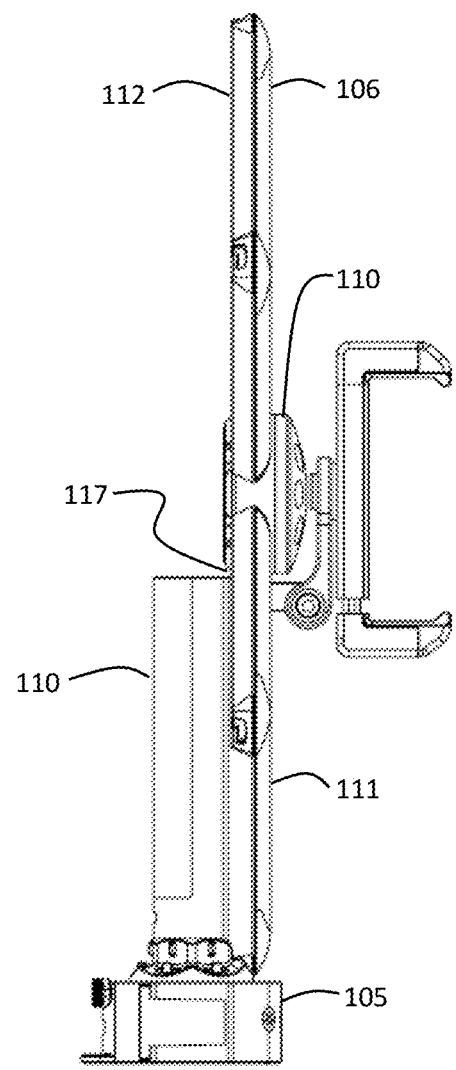
FIG. 3A is a side view of a deployable lighting system with device support in a fully deployed configuration according to a first embodiment of the present invention.
Figure 3B:
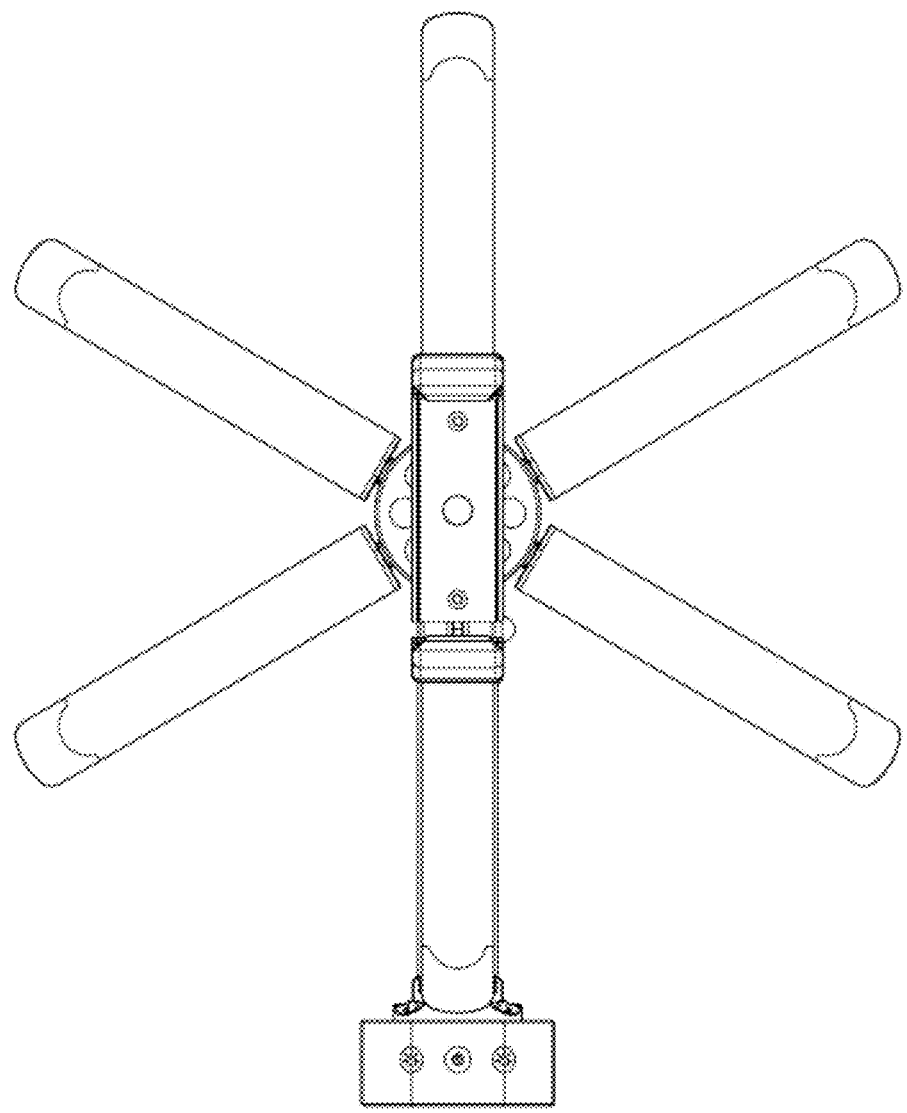
FIG. 3B is a front view of a deployable lighting system with device support in a fully deployed configuration according to a first embodiment of the present invention.
Figure 3C:
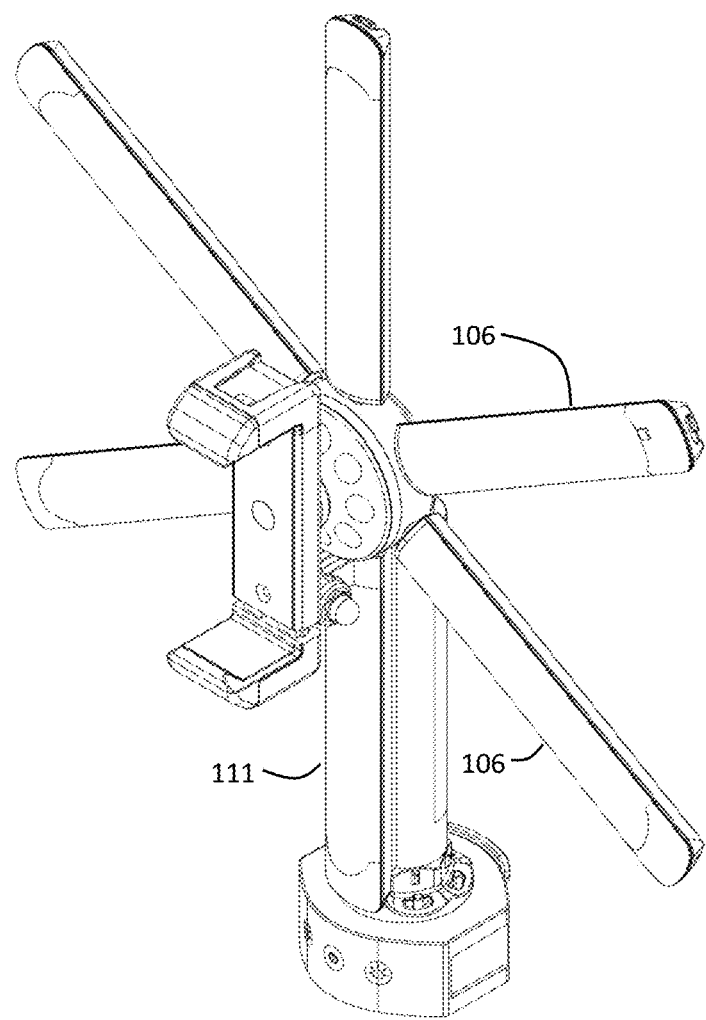
FIG. 3C is an oblique view of a deployable lighting system with device support in a fully deployed configuration according to a first embodiment of the present invention.
Figure 3D:
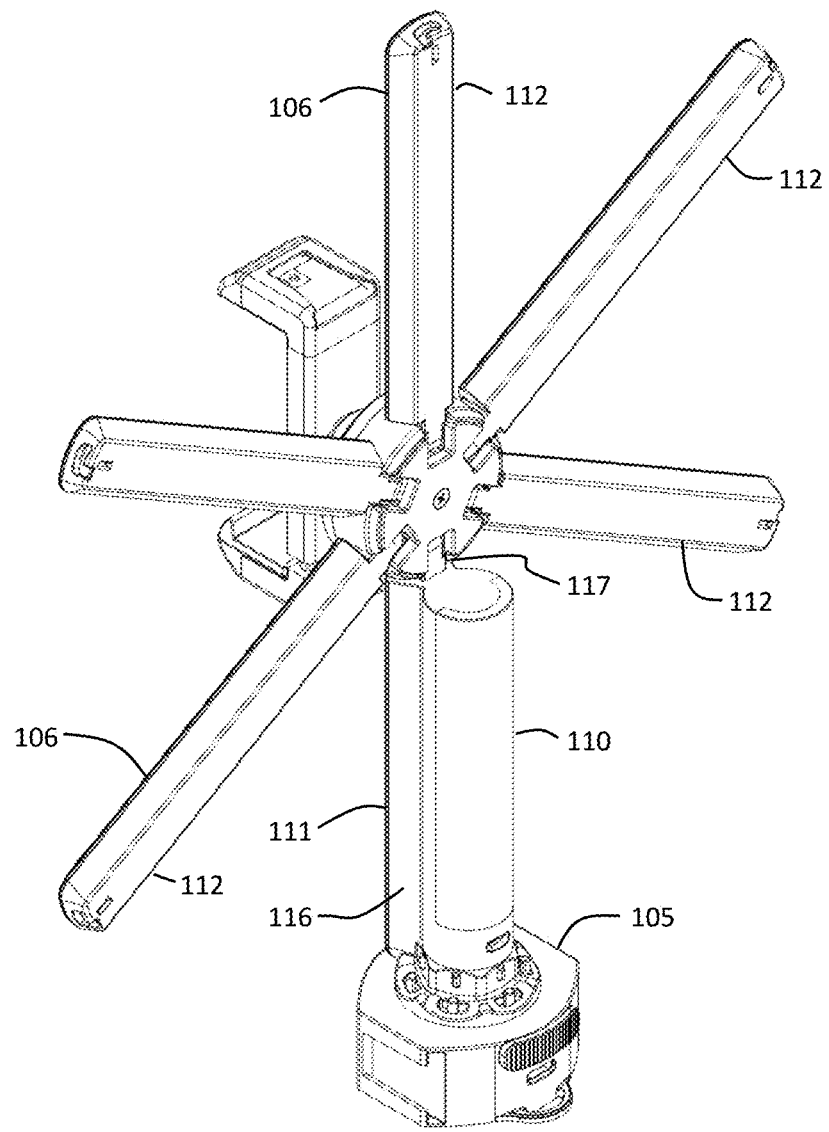
FIG. 3D is an oblique view of a deployable lighting system with device support in a fully deployed configuration according to a first embodiment of the present invention.

A deployable lighting system with device support adapted to allow a user to deploy lighting that may be used while recording or live-streaming video. The device support may be mounted upon a tripod, or other support, or may be self-supporting. The device support is adapted to support an electronic device, such as a cellular telephone, with a device clip. A deployable lighting system may be deployed which deploys from a compact, stowed, configuration to a deployed configuration in which a plurality of lights may surround the device clip. The deployable lighting system may take the shape of a ring light or a star light, such that a user doing self-video is well lit. The lighting system may allow for warmer or cooler tones to be selected from the lighting system.

DETAILED DESCRIPTION

FIGS. 1A-1E illustrate a deployable lighting system with device support 100 according to a first embodiment of the present invention, shown in a stowed configuration. In some aspects, the deployable lighting system with device support may be mounted upon an external support, such as a tripod. The device support may support a device such as a cellular telephone as an extension above the support while in a stowed configuration, and with its deployable lighting system deployed may provide lighting for a user, such as when the cellular telephone is used for video production or video streaming.

A base 105 resides at the bottom of the support, and may include a threaded insert 130 on its bottom surface adapted to interface with a threaded post of a tripod, for example. Extending upwards from the base 105 is a central post 110, which is coupled to the base on its bottom end. The central post 110 may contain a battery or batteries which power the lighting system. The base 105 may include a latch release, such as a button or slider, which releases the deployable arms 112 from a releasable latch 112. The base may also have control buttons which control the lighting functions. In a stowed configuration, the deployable arms are latched into a vertical position along the central post 110. The deployable arms are coupled to a central disc 101 using a deployment hinge 107.

At an upper end of the central post 110 a rotating mount 115 couples to a pivot arm 113. The pivot arm 113 is rotatably coupled to gripping clip 102 at a clip pivot 114. The clip pivot 114 allows the gripping clip 102 to rotate such that the retained device can be rotated from a landscape to a portrait position, for example. The pivoting mount 115 allows for the device to be adjusted away from vertical as desired. In some aspects, the gripping clip 102 may be fixedly mounted to the central post 110. In some aspects, the gripping clip 102 may be fixedly mounted to the central post 110 with an extension arm. The gripping clip 102 is adapted to be extended such that a device may be placed between the upper arm 103 and a lower arm 104. The arms may be spring loaded such that the spring force resists extension of the arms from each other, capturing a device between the arms after insertion. In some aspects, a single arm may be extendable from the central portion of the clip. In some aspects, both arms may be extendable for the central portion of the post.

FIGS. 2A-D illustrate the device support with a deployable lighting system 100 in a partially deployed configuration. In this configuration, the deployable arms 112 have been released from the base 105 and have pivoted around their deployment hinges 107 to be in plane with each other. The fixed arm 111, which is in line with the gripping clip 102, remains along the central post 110. Each of the deployable arms 112, along with the fixed arm 111, have a lens 106 covering a recess within which resides a plurality of lights, such as LEDs. Although illustrated in FIGS. 2A-D in this partially deployed configuration, in some aspects the deployment which begins by the release of the releasable latches 109, and through to full deployment, is a continuous process.

FIGS. 3A-D illustrate the deployable lighting system with device support in a fully deployed configuration. The central disc 101 has rotated up around a central disc hinge 117. The deployable arms are extended from the central disc and are in plane with the fixed arm. In an exemplary embodiment, the entire deployment is initiated with the release of the deployable arms, and the central disc is held in the stowed configuration by the latched deployable arms. As the deployable arms are released, both the arms deploy and the central disc deploys to the fully deployed configuration. The configuration as seen in FIGS. 3A-D may be referred to as a star configuration.

Figure 4A:
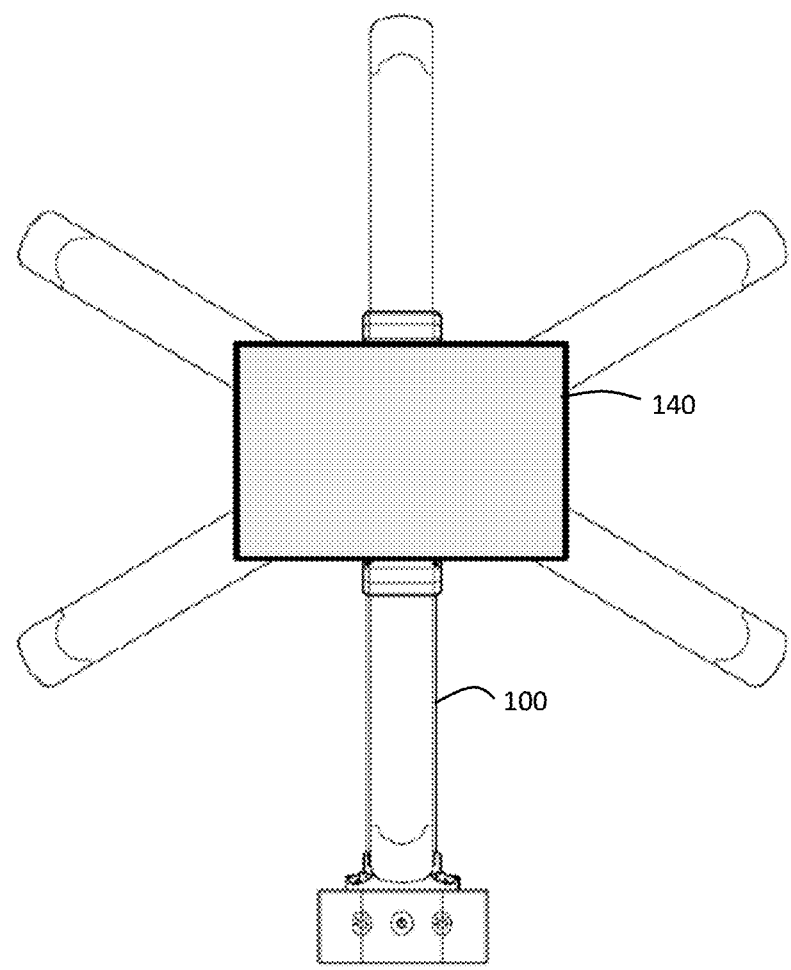
FIG. 4A is a front view of deployable lighting system with device support with device in a stowed configuration according to a first embodiment of the present invention.

FIG. 4A illustrates the deployable lighting system with device support 100 with a device, which may be a cellular telephone. The mounted cellular telephone may be used to support video operations, and the lights within the deployable arms may provide appropriate lighting onto the user to enhance the video operations. In some aspects, the lights within the recesses in the deployable arms may be a plurality of warm and cool LEDs, and the nature of the lighting may be selected by the user using controls on the base 105. In some aspects, the lighting may be more neutral, with an equal distribution of power to both the warm and the cool lights. In some aspects, the proportion of power may be altered such that the lighting is warmer or cooler.

Figure 4B:
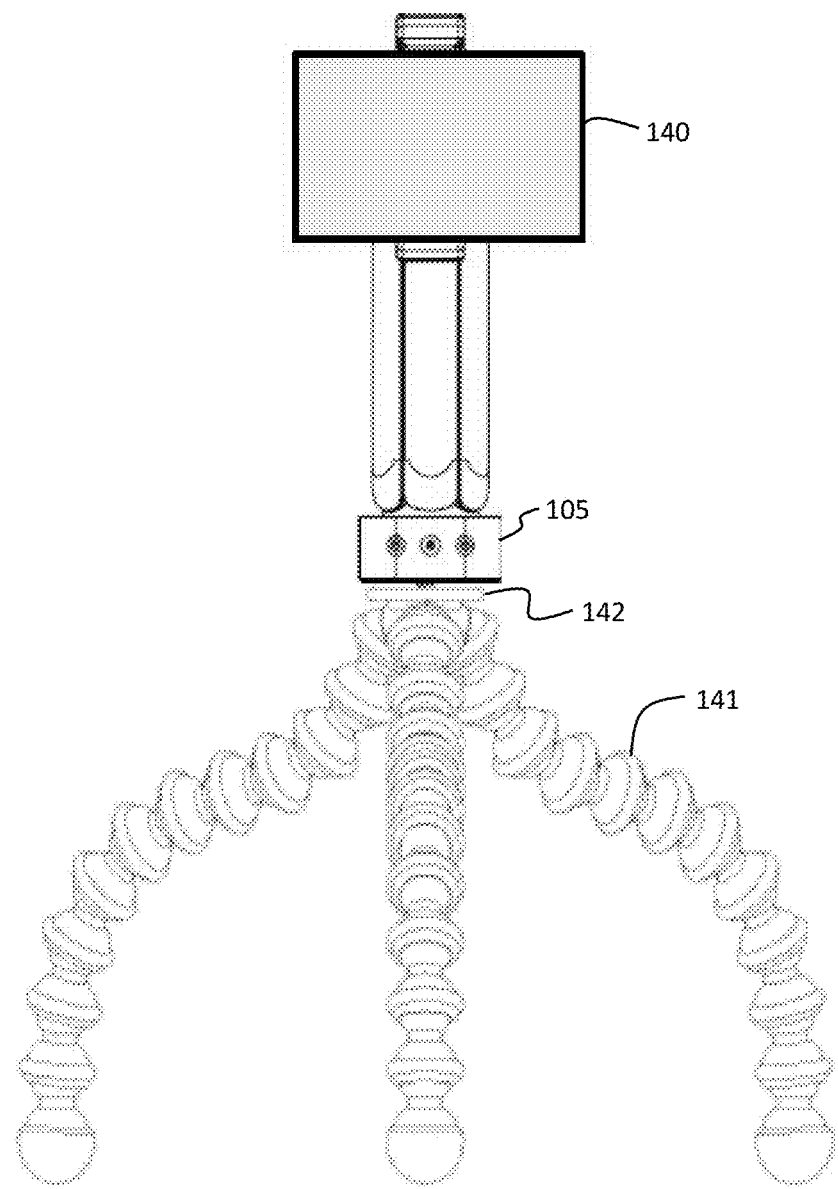
FIG. 4B is a front view of a deployable lighting system with device support with device in a stowed configuration on a tripod according to a first embodiment of the present invention.
Figure 4C:
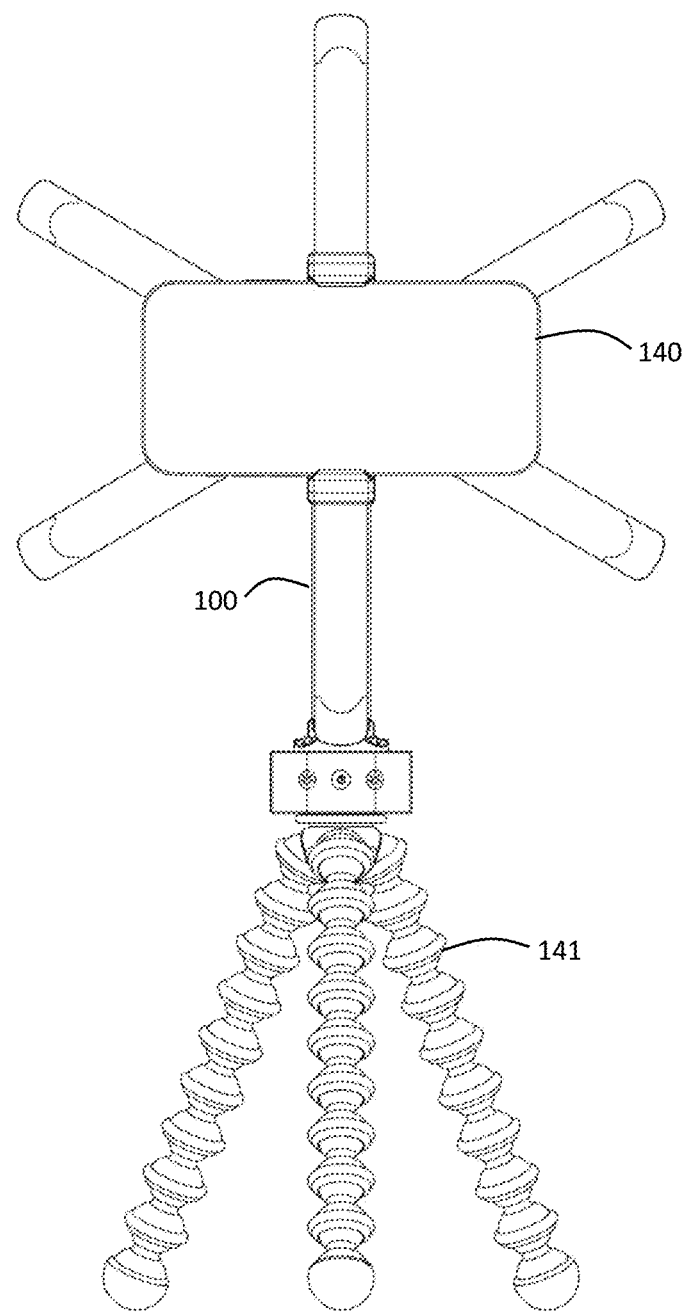
FIG. 4C is a front view of a deployable lighting system with device support with device in a fully deployed configuration on a tripod according to a first embodiment of the present invention.
Figure 5A:
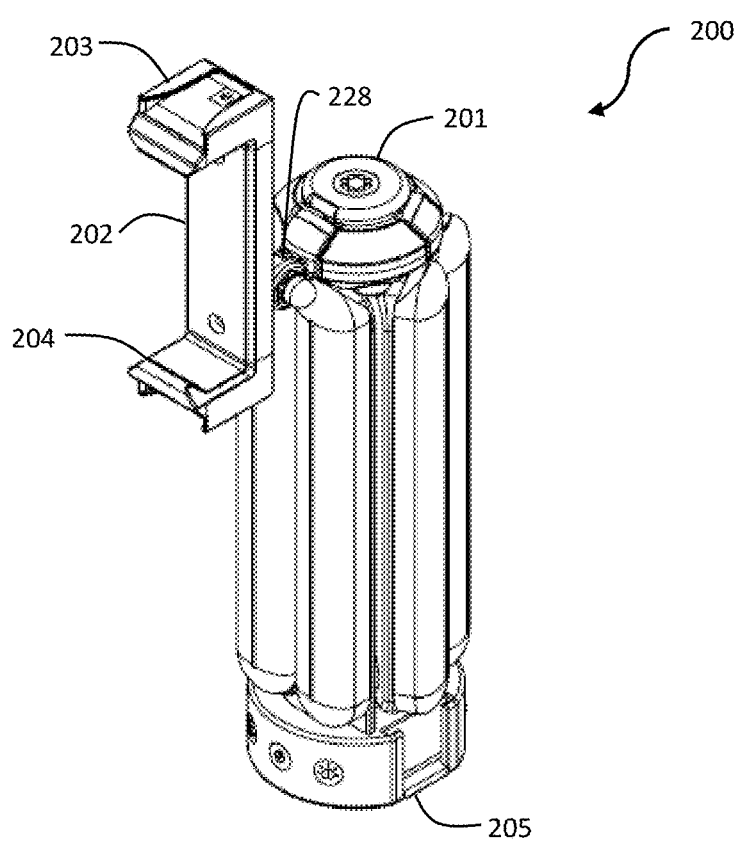
FIG. 5A is an oblique view of a deployable lighting system with device support in a stowed configuration according to a second embodiment of the present invention.
Figure 5B:
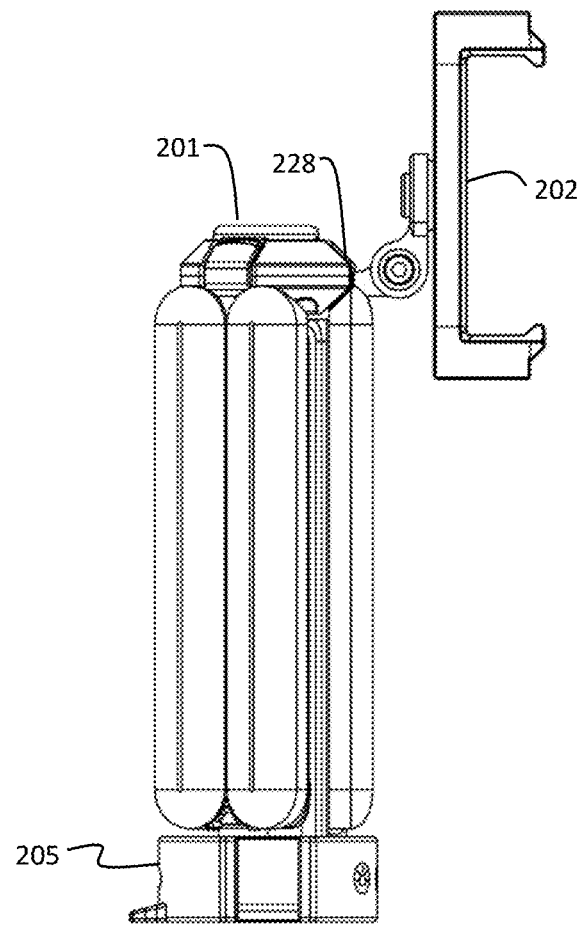
FIG. 5B is a side view of a deployable lighting system with device support in a stowed configuration according to a second embodiment of the present invention.
Figure 5C:
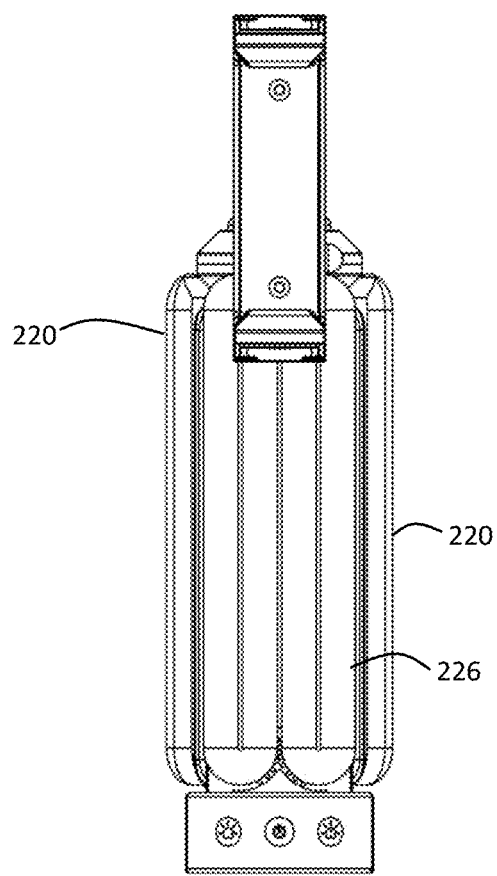
FIG. 5C is a front view of a deployable lighting system with device support in a stowed configuration according to a second embodiment of the present invention.
Figure 5D:
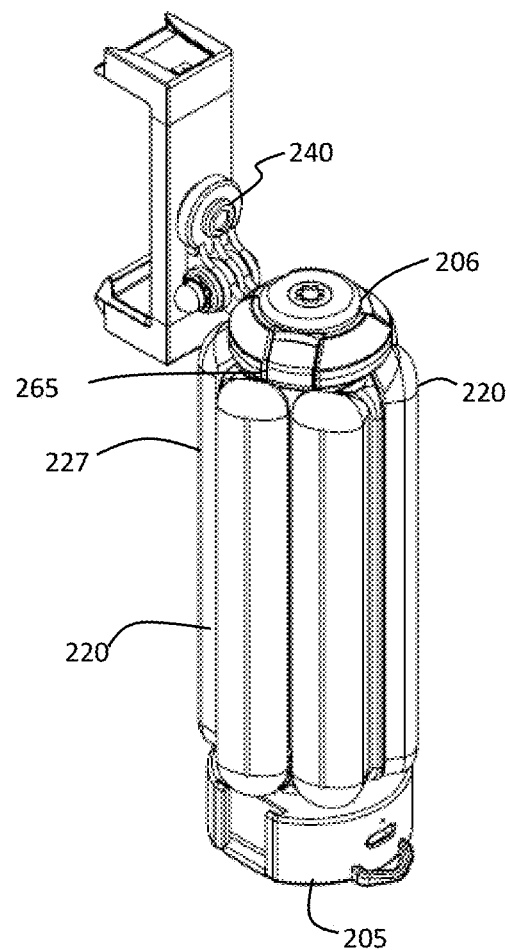
FIG. 5D is an oblique view of a deployable lighting system with device support in a stowed configuration according to a second embodiment of the present invention.
Figure 6A:
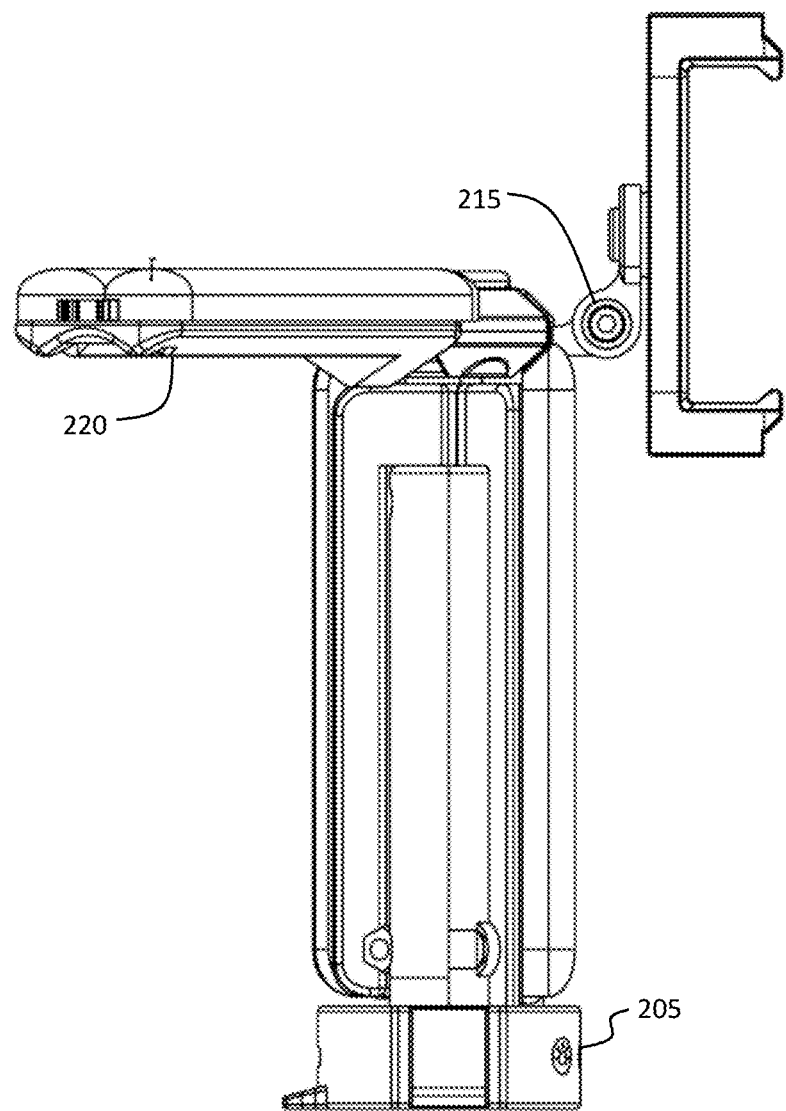
FIG. 6A is a side view of deployable lighting system with device support in a partially deployed configuration according to a second embodiment of the present invention.
Figure 6B:
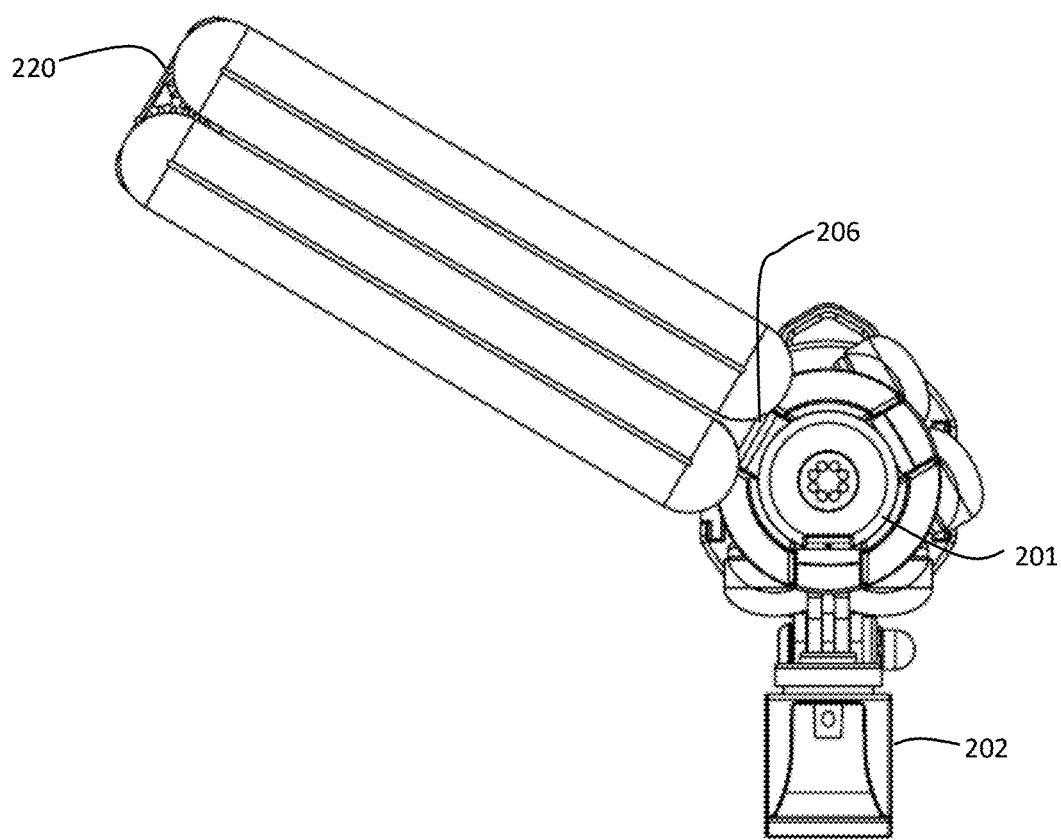
FIG. 6B is a top view of deployable lighting system with device support in a partially deployed configuration according to a second embodiment of the present invention.
Figure 6C:
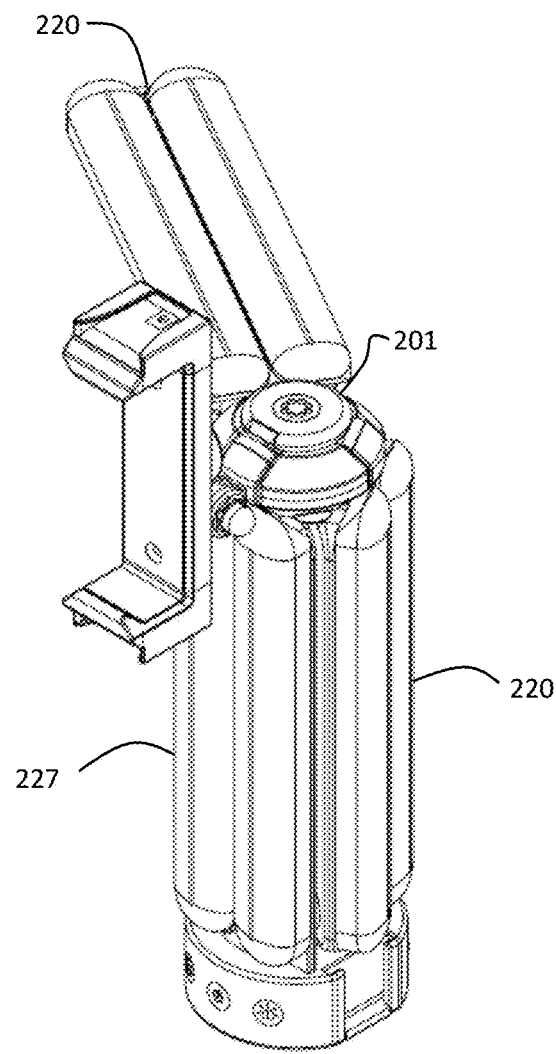
FIG. 6C is an oblique view of a deployable lighting system with device support in a partially deployed configuration according to a second embodiment of the present invention.
Figure 6D:
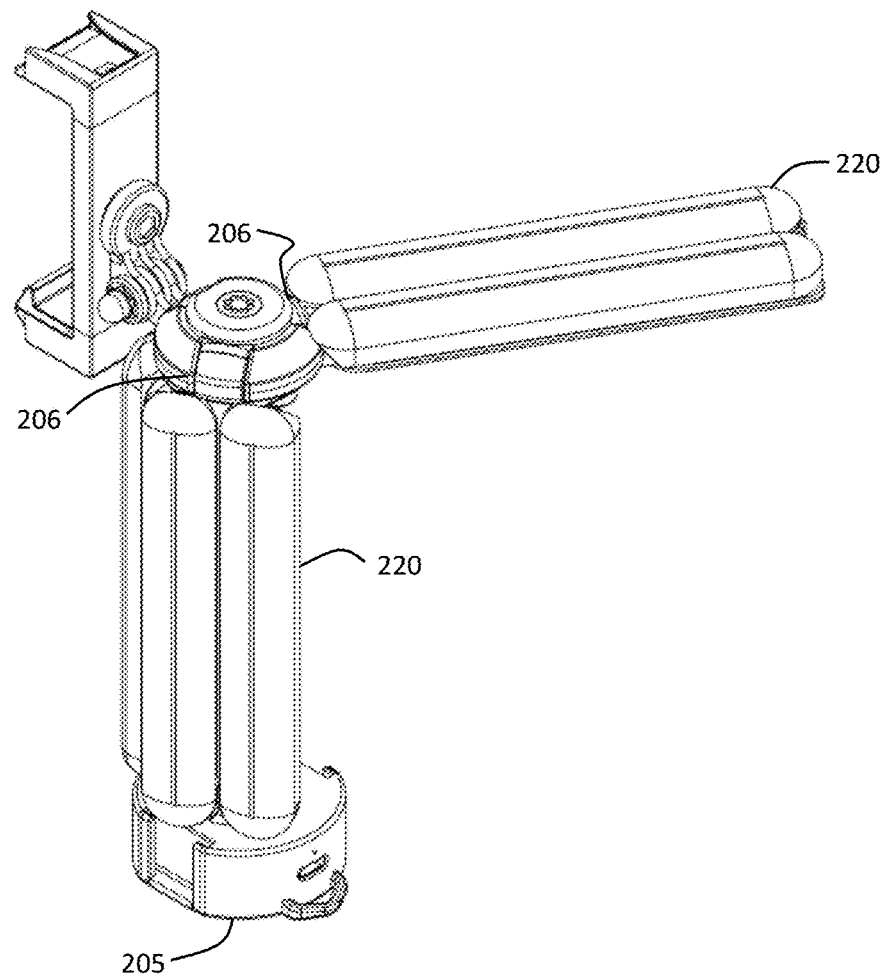
FIG. 6D is an oblique view of a deployable lighting system with device support in a partially deployed configuration according to a second embodiment of the present invention.
Figure 7A:
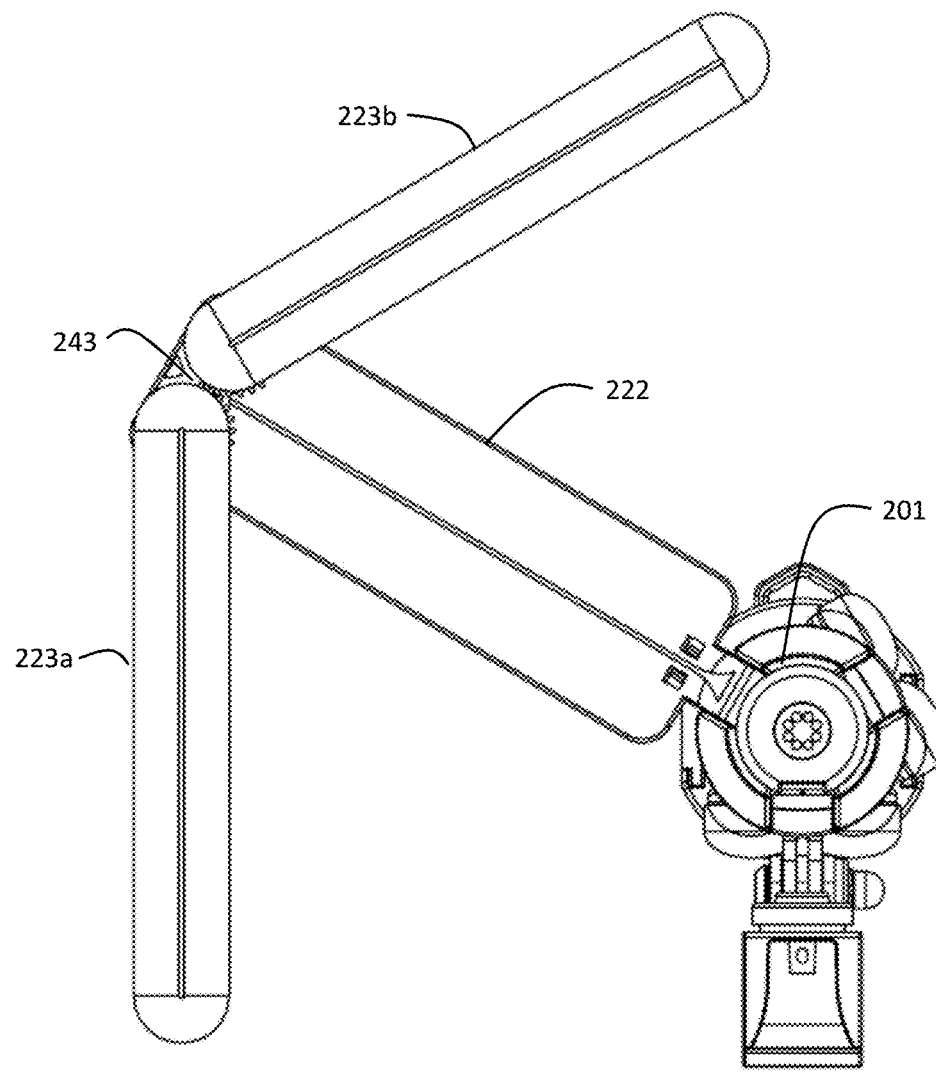
FIG. 7A is a top view of a deployable lighting system with device support in a partially deployed configuration according to a second embodiment of the present invention.
Figure 7B:
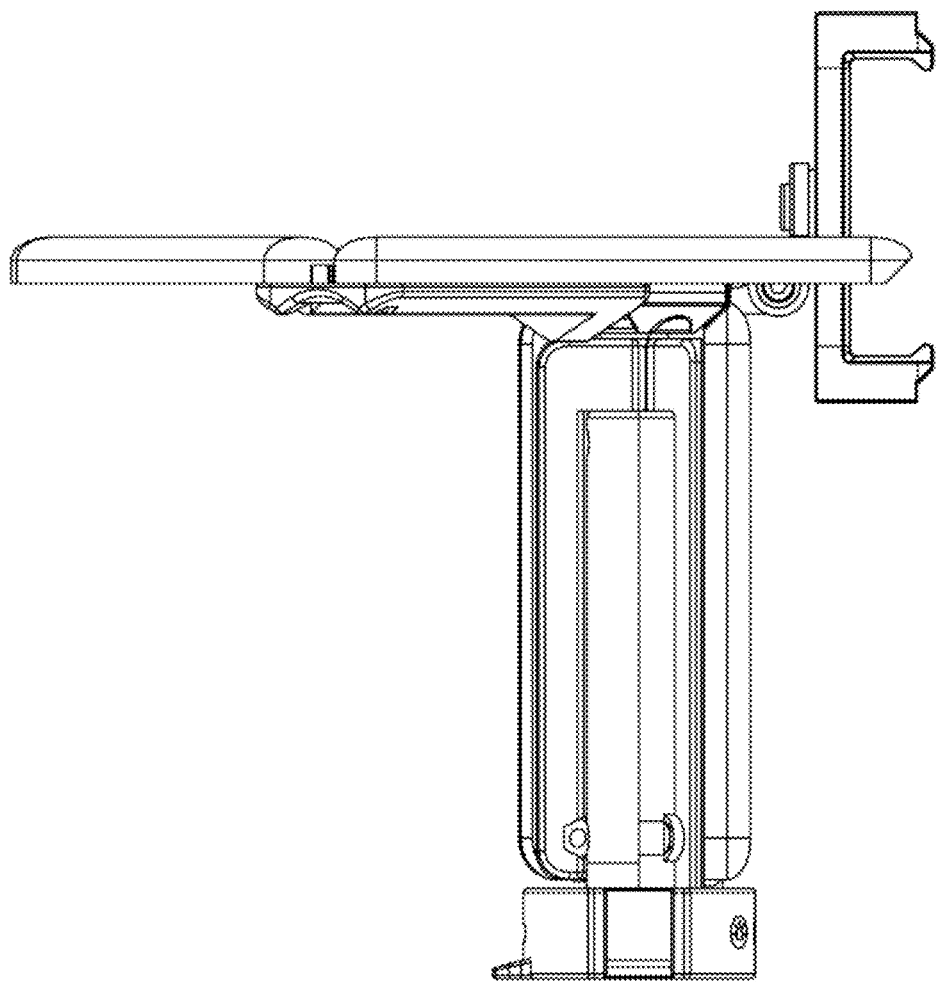
FIG. 7B is a side view of a deployable lighting system with device support in a partially deployed configuration according to a second embodiment of the present invention.
Figure 7C:
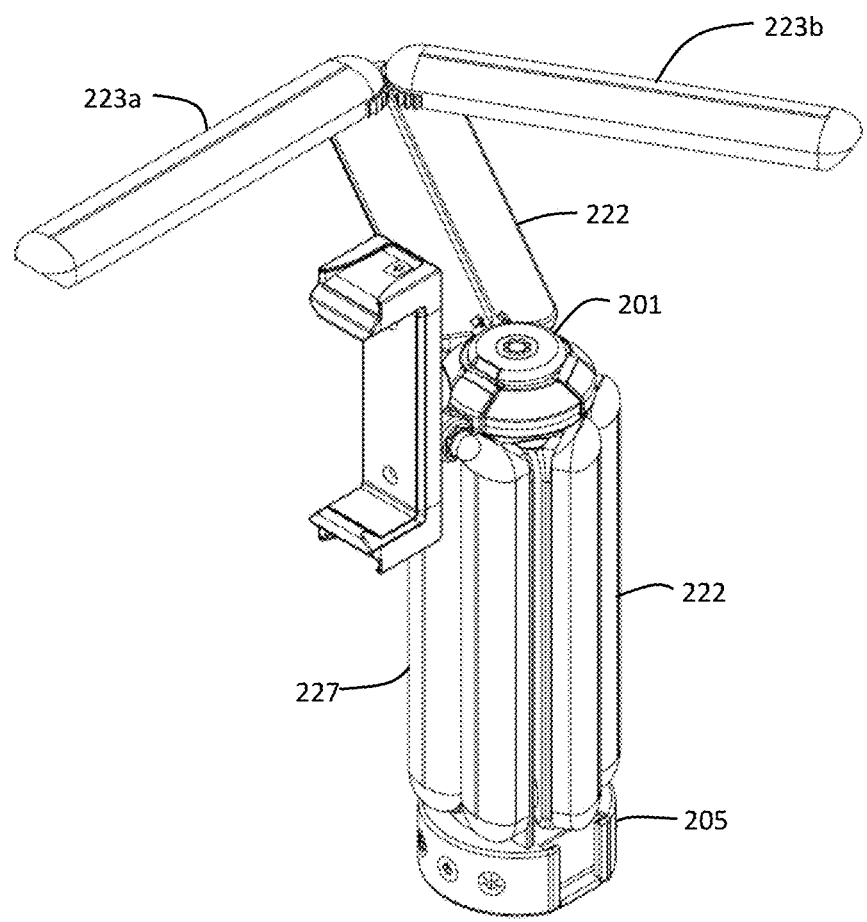
FIG. 7C is an oblique view of a deployable lighting system with device support in a partially deployed configuration according to a second embodiment of the present invention.
Figure 7D:
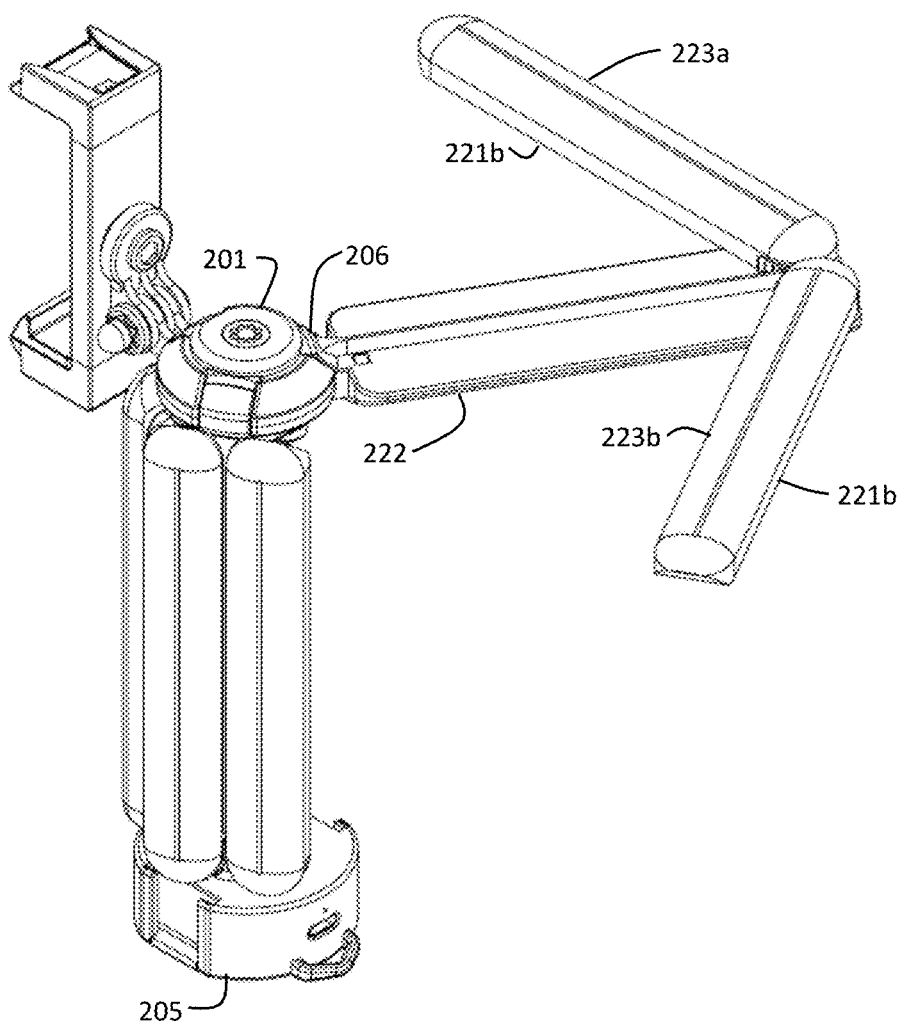
FIG. 7D is an oblique view of a deployable lighting system with device support in a partially deployed configuration according to a second embodiment of the present invention.

FIG. 4B illustrates a deployable lighting system with device support 100 with a device 140 mounted on a tripod 141. The base 105 of the device support may thread onto a post extended from the top 142 of the tripod 141. The device support is shown supporting the device 140 while in the stowed configuration. FIG. 4C illustrates the device support with lighting system 100 with a device 140 mounted on a tripod 141 while in a fully deployed configuration.

FIGS. 5A-D illustrate a deployable lighting system with device support 200 according to a second embodiment of the present invention. In some aspects, the deployable lighting system with device support may be mounted upon an external support, such as a tripod. The device support may support a device such as a cellular telephone as an extension above the support while in a stowed configuration, and with its deployable lighting system deployed may provide lighting for a user, such as when the cellular telephone is used for video production or video streaming.

A base 205 resides at the bottom of the support, and may include a threaded insert on its bottom surface adapted to interface with a threaded post of a tripod, for example. Extending upwards from the base 205 is a central post 266, which is coupled to the base on its bottom end. The central post may contain a battery or batteries which power the lighting system. The base 205 may include a latch release, such as a button or slider, which releases the deployable arms 220 from a releasable latch. The base may also have control buttons which control the lighting functions. In a stowed configuration, the deployable arms are latched into a vertical position along the central post. The deployable arms are coupled to a central disc 201 using a deployment hinge 206.

At an upper end of the central post a mount arm 228 couples to a pivot arm 215. The pivot arm is rotatably coupled to gripping clip 202 at a clip pivot 240. The clip pivot allows the gripping clip 202 to rotate such that the retained device can be rotated from a landscape to a portrait position, for example. The pivot between the pivot arm 215 and the mount arm 228 allows for the device to be adjusted away from vertical as desired. The gripping clip 202 is adapted to be extended such that a device may be placed between the upper arm 203 and a lower arm 204. The arms may be spring loaded such that the spring force resists extension of the arms from each other, capturing a device between the arms after insertion. In some aspects, a single arm may be extendable from the central portion of the clip. In some aspects, both arms may be extendable for the central portion of the post.

FIGS. 6A-D illustrate the deployable lighting system with device support 200 in a partially deployed configuration. In this configuration, one of the deployable arms 220 has been released from the base 205 and has pivoted around its deployment hinges 265 to be in a position 90 degrees from its stowed position. In some aspects, the light arms will release and deploy further once the deployable arm reaches the deployed perpendicular position. In some aspects, the deployable arms are manually raised by the user to the perpendicular, deployed, position, at which time the light arms then automatically further deploy out to their final deployed positions. FIGS. 7A-D illustrate further deployed configuration wherein the light arms 221a, 221b have been rotated out from the deployable arm base 222. In some aspects, the light arms 221a, 221b are coupled with gearing 243 such that they deploy in equal and opposite positions. The light arms have lenses 223a, 223b which may cover a recess within which resides a plurality of lights, such as LEDs.

Figure 8A:
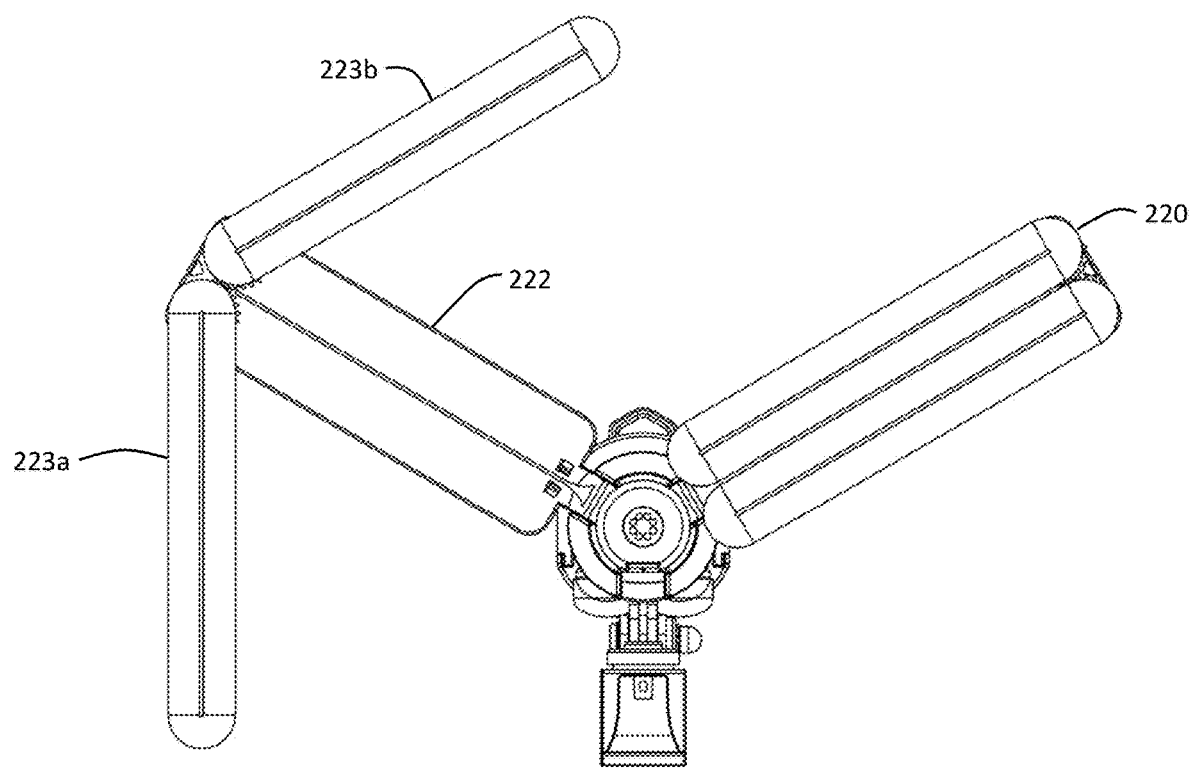
FIG. 8A is a top view of a deployable lighting system with device support in a partially deployed configuration according to a second embodiment of the present invention.
Figure 8B:
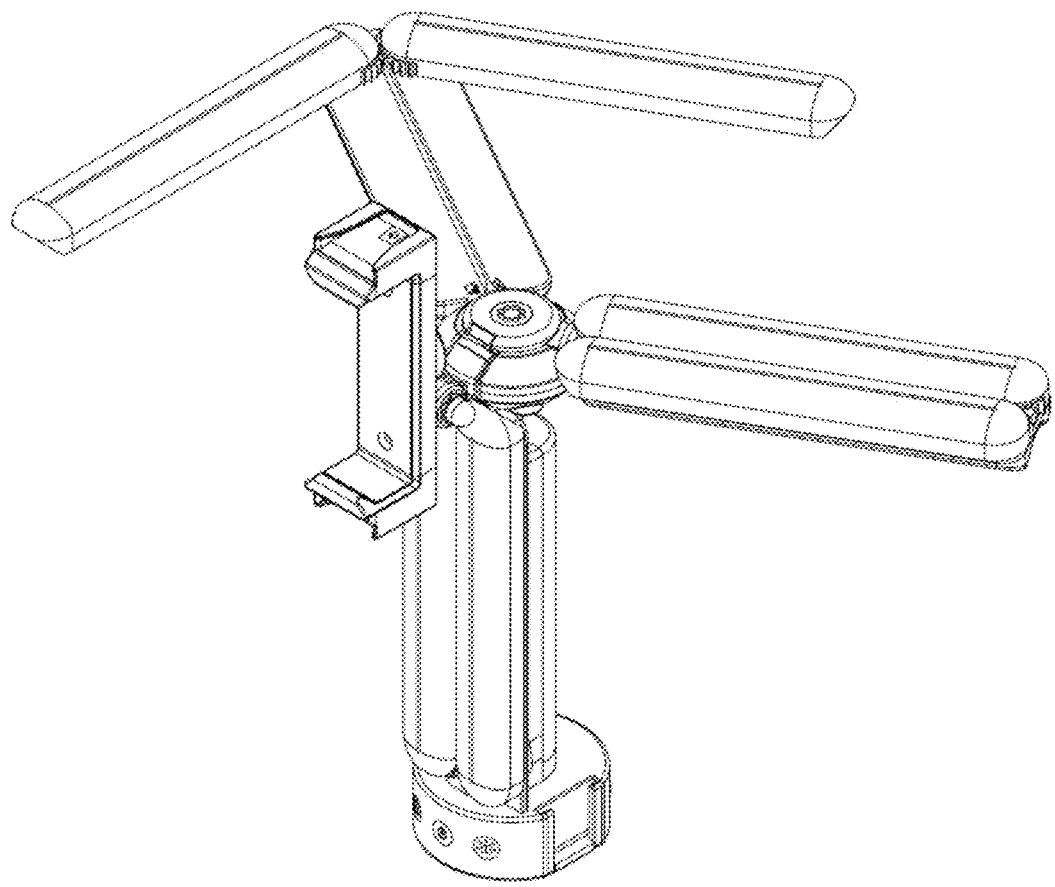
FIG. 8B is an oblique view of a deployable lighting system with device support in a partially deployed configuration according to a second embodiment of the present invention.
Figure 8C:
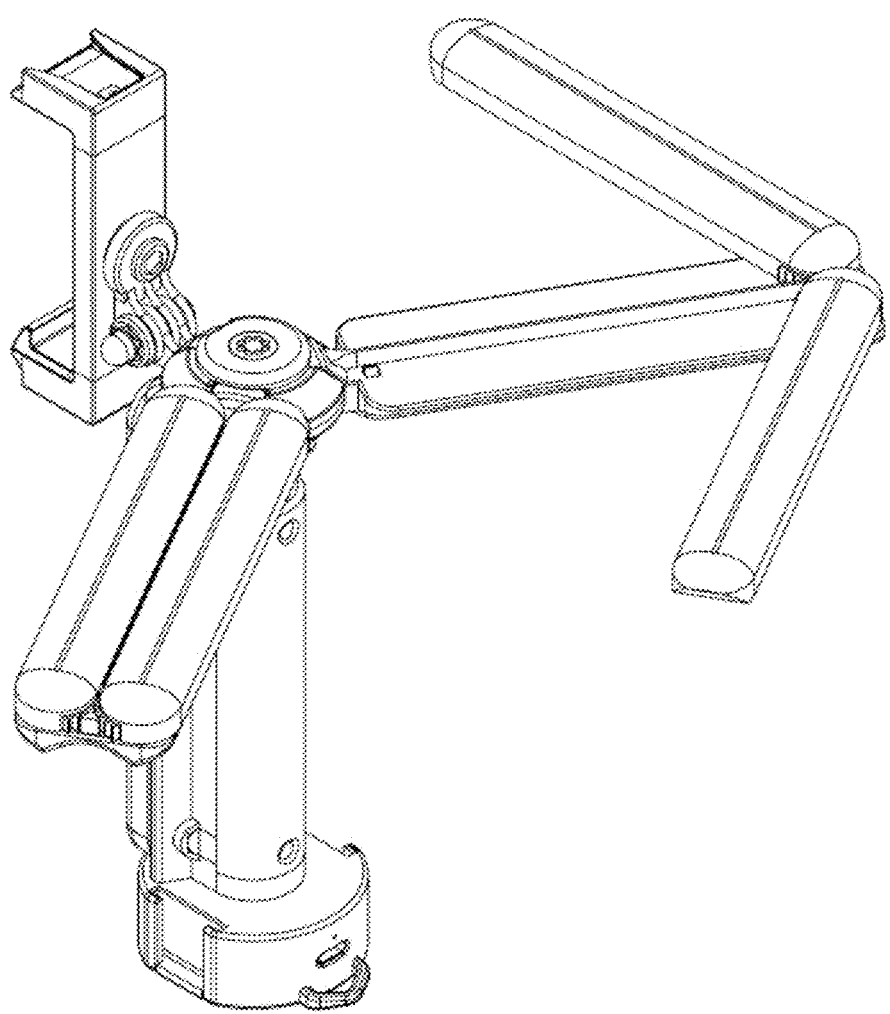
FIG. 8C is an oblique view of a deployable lighting system with device support in a partially deployed configuration according to a second embodiment of the present invention.
Figure 9A:
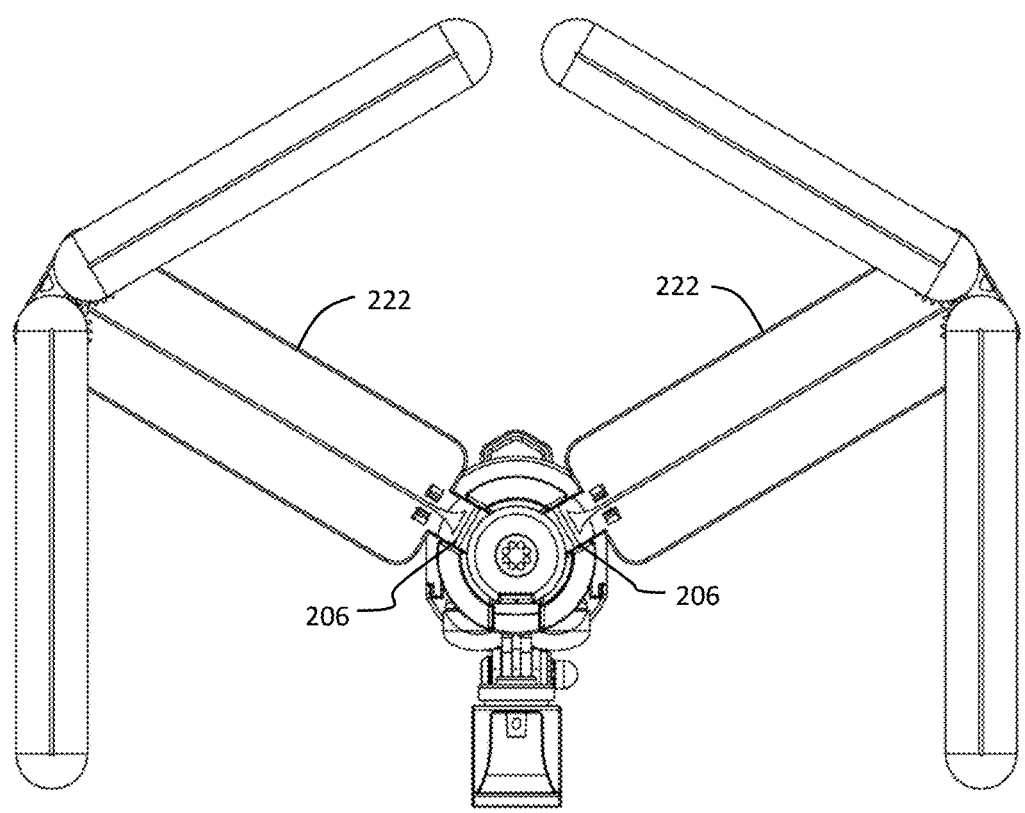
FIG. 9A is a top view of a deployable lighting system with device support in a partially deployed configuration according to a second embodiment of the present invention.
Figure 9B:
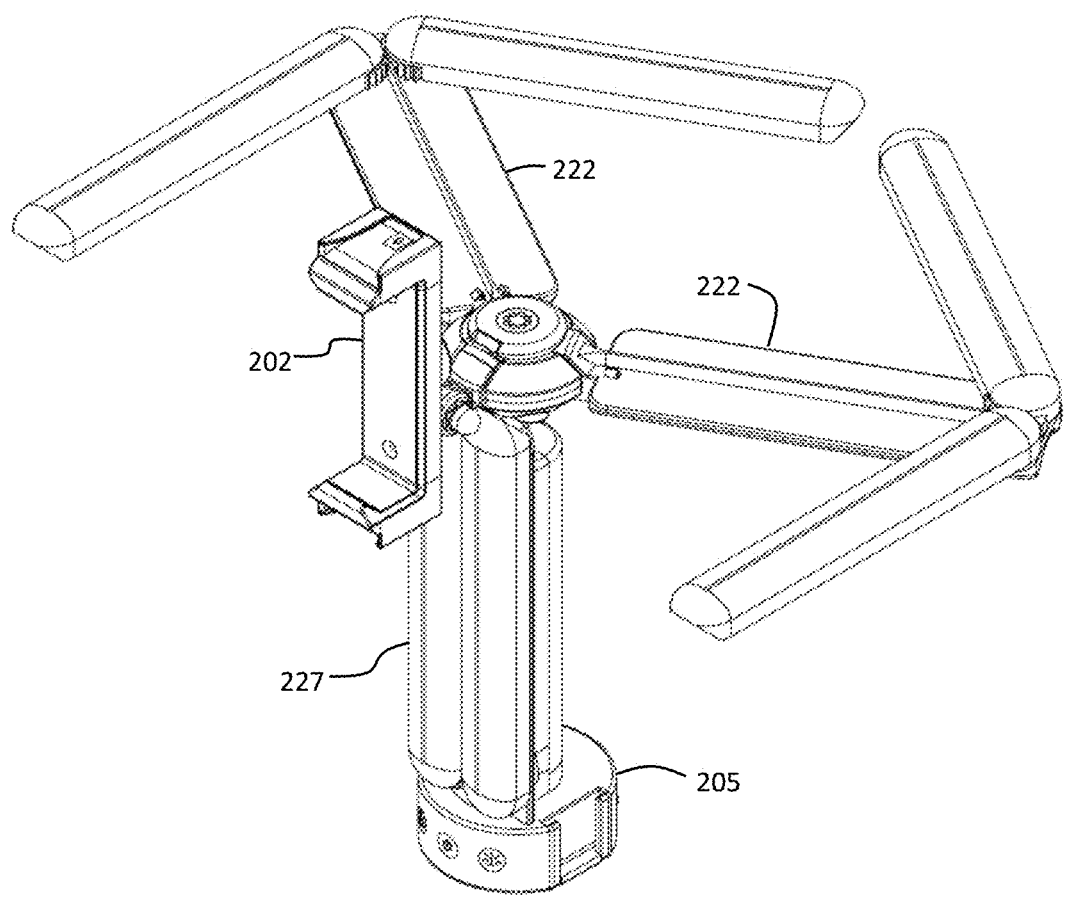
FIG. 9B is an oblique view of a deployable lighting system with device support in a partially deployed configuration according to a second embodiment of the present invention.
Figure 9C:
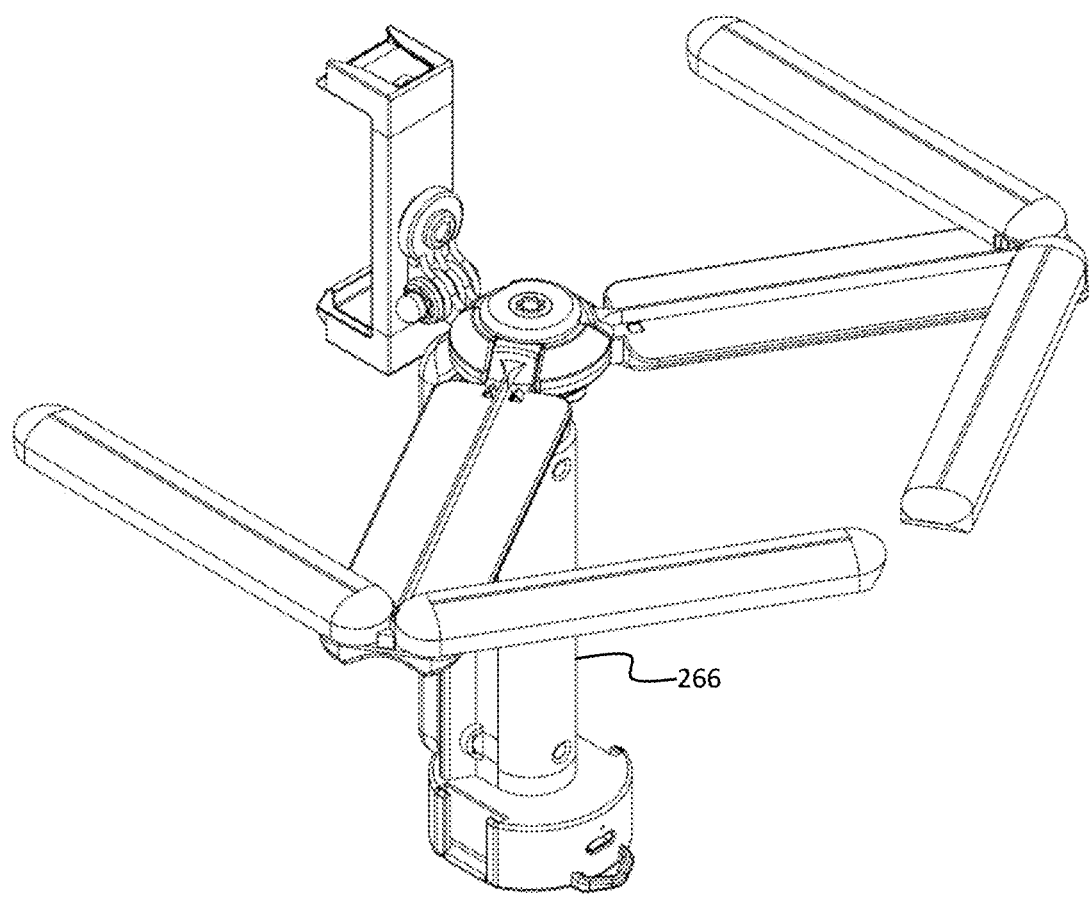
FIG. 9C is an oblique view of a deployable lighting system with device support in a partially deployed configuration according to a second embodiment of the present invention.

FIGS. 8A-C illustrate the deployable lighting system with device support 200 in a more deployed configuration. The second deployable arm has deployed to a position 90 degrees from its stowed position. FIGS. 9A-C illustrate the device support with the light arms of the second deployable arm now rotated out to their deployed position.

Figure 10A:
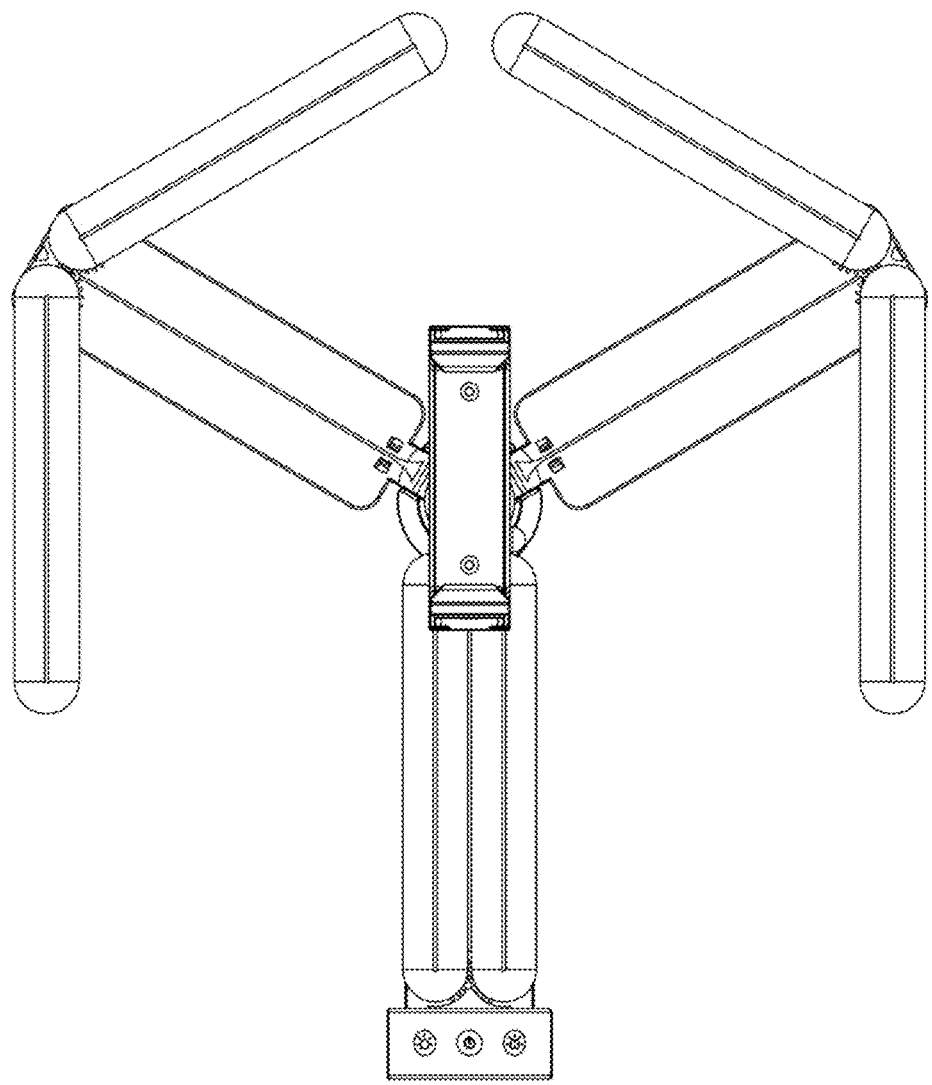
FIG. 10A is a front view of a deployable lighting system with device support in a partially deployed configuration according to a second embodiment of the present invention.

FIG. 10A illustrates the device support 200 with the central disc 201 now rotated up 90 degrees, bring the light arms into a position which can now shine light at a user who may be in front of the device support, such as when a device is mounted into the gripping clip 202 and a user is utilizing video production.

Figure 11A:
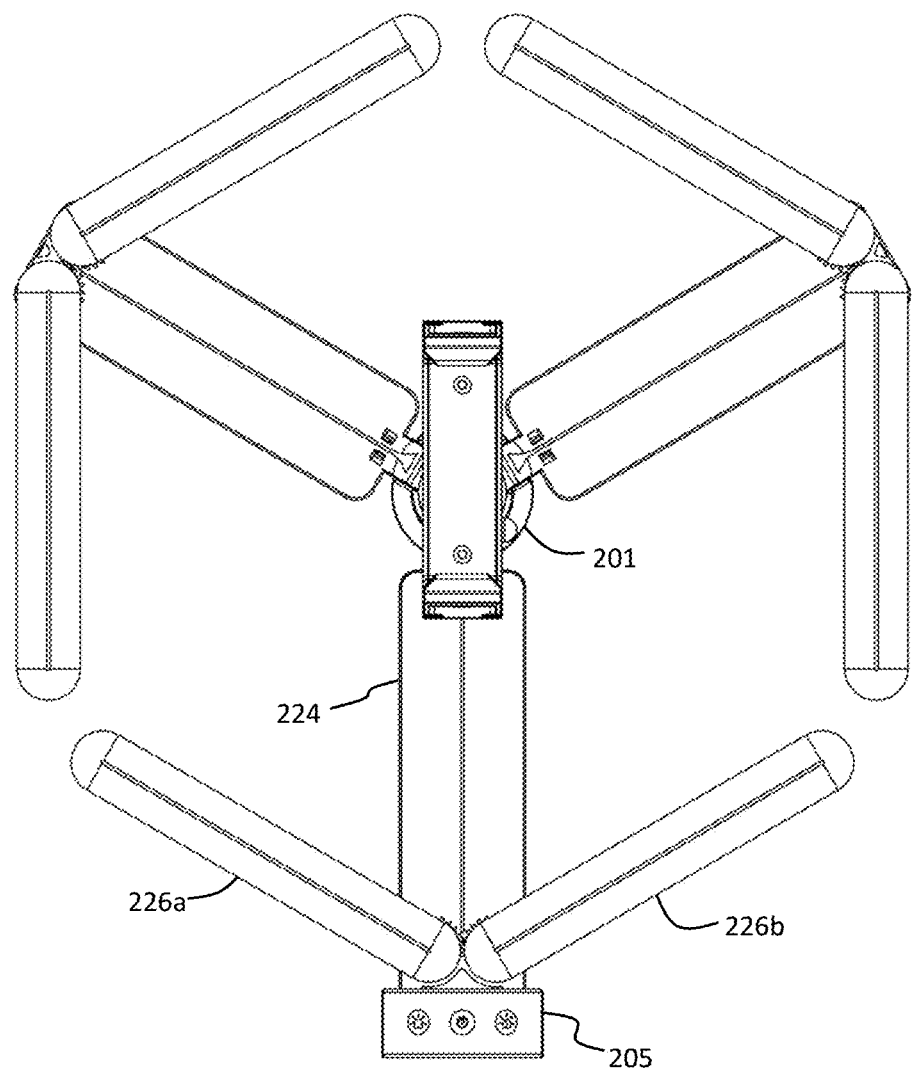
FIG. 11A is a front view of a deployable lighting system with device support in a fully deployed configuration according to a second embodiment of the present invention.
Figure 11B:
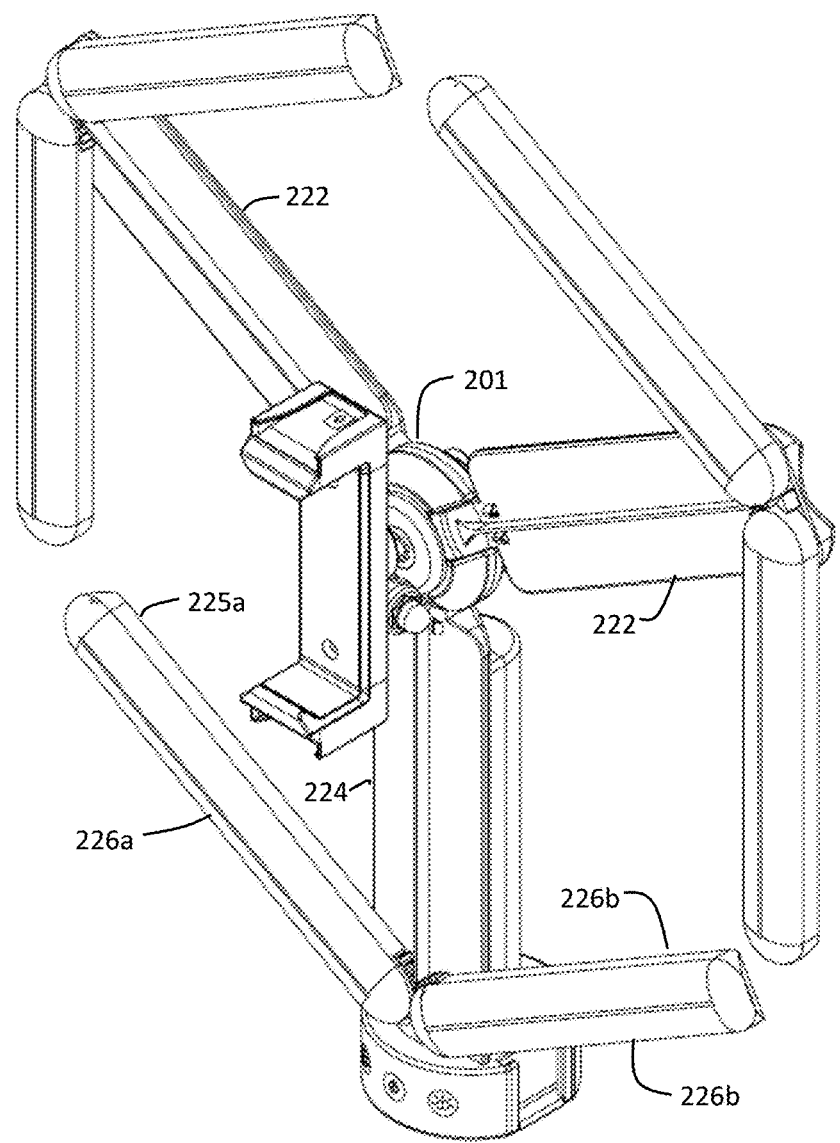
FIG. 11B is an oblique view of a dev deployable lighting system with device support in a fully deployed configuration according to a second embodiment of the present invention.
Figure 11C:
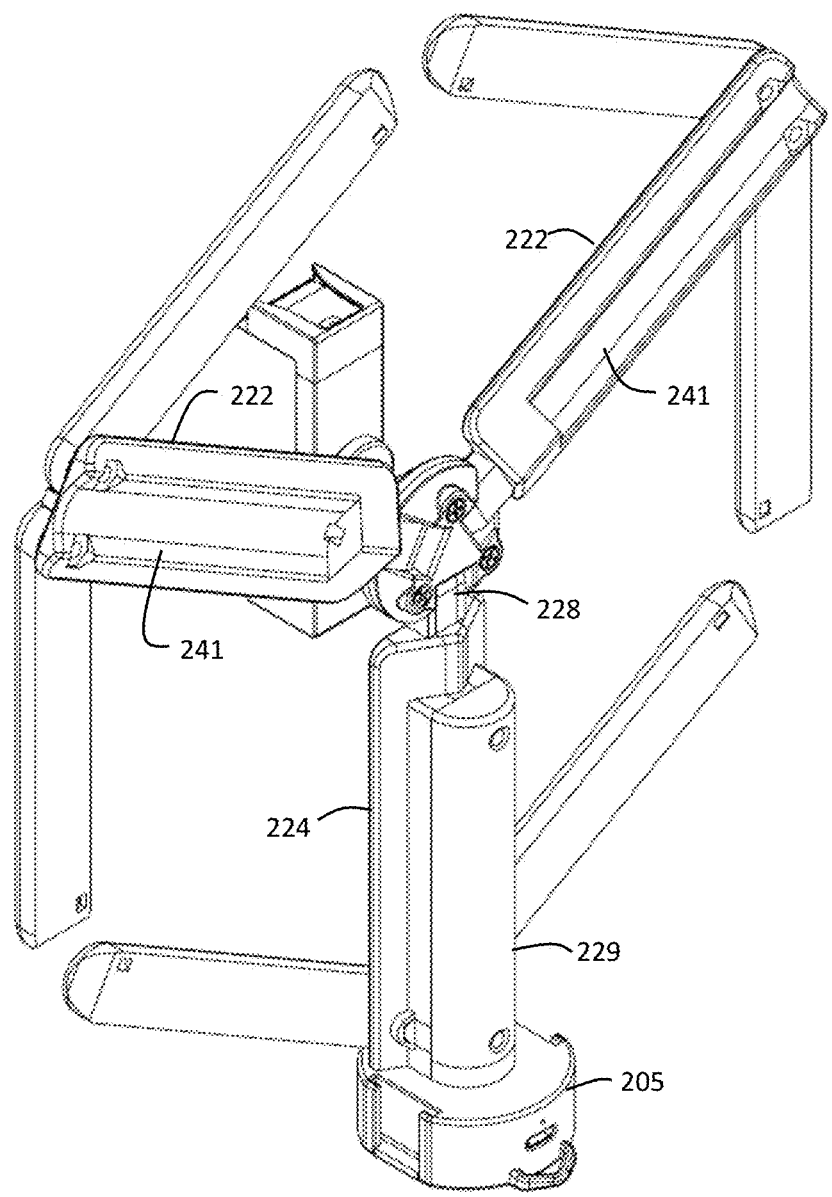
FIG. 11C is an oblique view of a deployable lighting system with device support in a fully deployed configuration according to a second embodiment of the present invention.

FIGS. 11A-C illustrates the device support 200 in a final deployed position, wherein the lighting array is arranged into a circle light configuration. In this final configuration, lighting arms 225a, 225b which did not hinge up as a unit relative to the central disc 201 have instead pivoted out away from their base 224. These lighting arms 225a, 225b similarly have lenses 226a, 226b which cover recess which contain lighting, as described above. As seen in a rear oblique view in FIG. 11C, the back sides of the deployable arms 222 have recesses 241 which may be adapted to allow for a compact stowed configuration around the central post 229.

Device supports with deployable lighting according to embodiments of the present invention allow a user to have access to a broad lighting, such as a star light or a circle light, which includes variable lighting tones, while also affording the convenience of stowing the system into an easily transported or stored configuration.

In some embodiments of the present invention, as seen in FIGS. 12A-13B, the deployable lighting system with device support may have a removable device support, allowing the deployable lighting system to be used in other ways, and also to allow for more compact stowage.

Figure 12A:
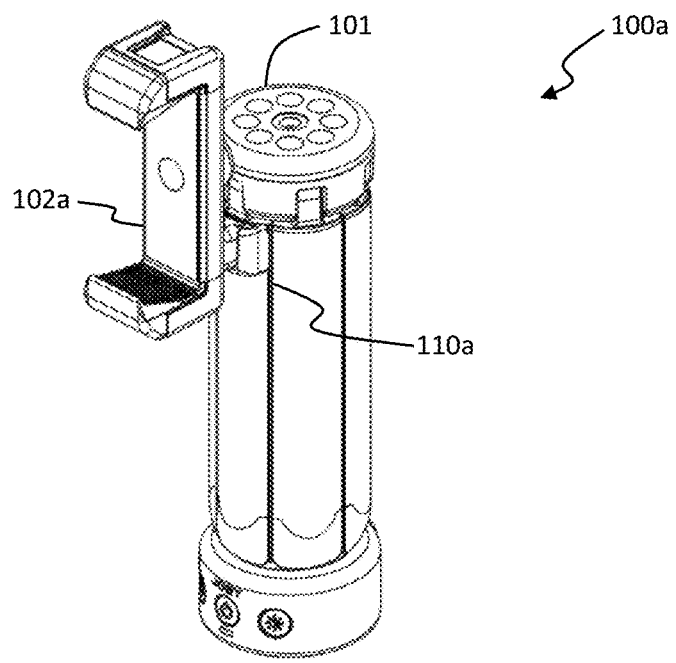
FIG. 12A is a view of a deployable lighting system with device support with a removable device support in a stowed configuration according to another embodiment of the present invention.
Figure 12B:
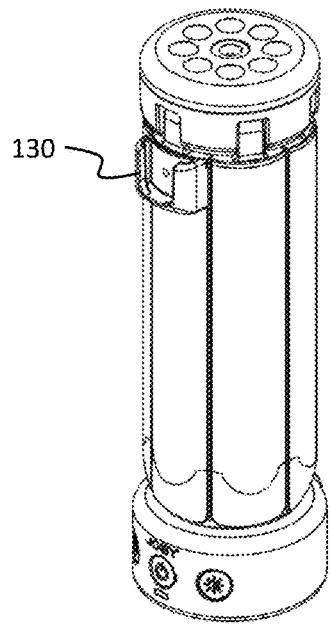
FIG. 12B is a view of a deployable lighting system with device support with the removable device support removed in a stowed configuration according to another embodiment of the present invention.
Figure 13A:
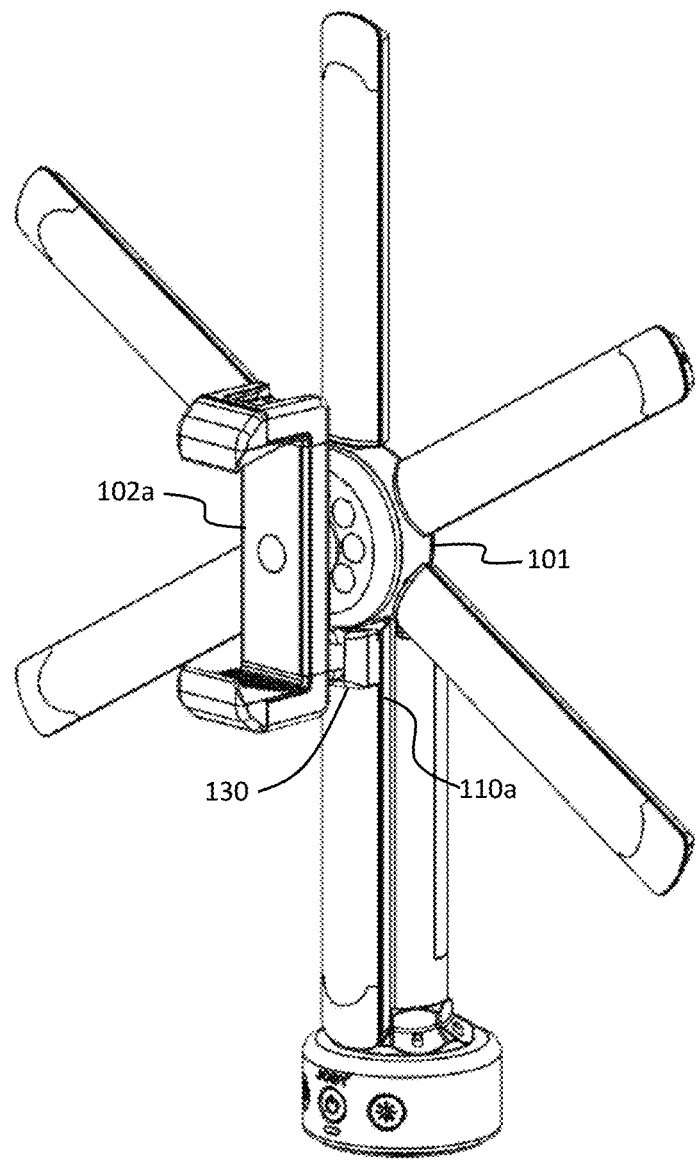
FIG. 13A is a view of a deployable lighting system with device support with a removable device support in a deployed configuration according to another embodiment of the present invention.
Figure 13B:
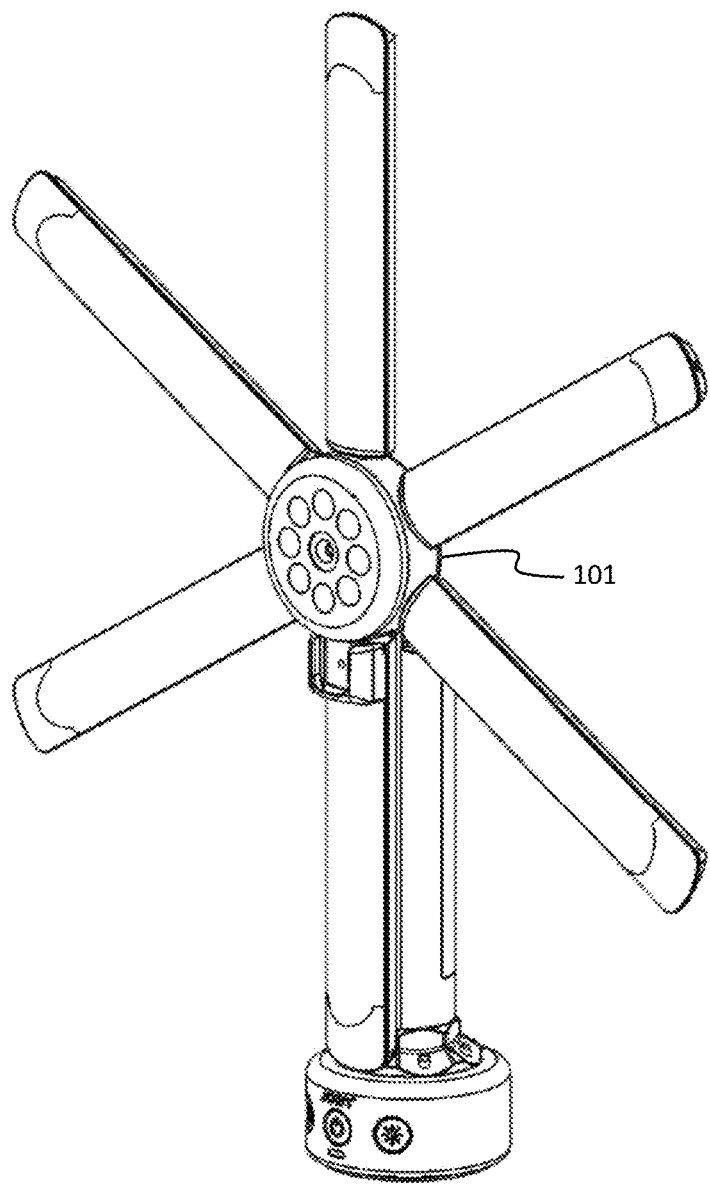
FIG. 13B is a view of a deployable lighting system with device support with a removable device support with the removable device support removed in a deployed configuration according to another embodiment of the present invention.

FIG. 12A illustrates a deployable lighting system with device support 100a wherein the gripping clip 102a is removable coupled to the central post 110a. The gripping clip 102a may have an insertable clip which inserts into a receiver 130. In some aspects, the receiver receives the insertable clip from above, such that when the central disc is in its stowed position the gripping clip 102a may be removed. This may allow for more compacts storage of the system, for example, or may also allow for the use of the lighting portions of the system without a device mounted thereon. FIGS. 12B and 13B illustrate the system without the gripping clip 102a mounted, in both a stowed and deployed lighting configuration, respectively. FIG. 13B illustrates the system 100a in a deployed position with the gripping clip 102a mounted therein. As can be seen, the deployed central disc 101 captures the gripping clip 102a in the receiver 130, reducing or eliminating the possibility of the removable gripping clip coming out during use.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

What is claimed is:

1. A deployable lighting system with device support, said system comprising:
    a central body, said central body having a longitudinal main axis, said central body having a front side;
    a central disc pivotally coupled to an upper end of said central body, said central disc deployable from a stowed position perpendicular to said longitudinal main axis to a deployed position parallel to said longitudinal main axis;
    a plurality of deployable arms pivotally coupled around a periphery of said central disc, said deployable arms releasably latched to a bottom end of said central body when said central disc is in the stowed position, said plurality of deployable arms deployable from a stowed position perpendicular to said central disc to a deployed position parallel to said central disc;
    a fixed arm, said fixed arm coupled to said central body along the front side of said central body; and
    a gripping clip coupled to an upper end of said front side of said central body, wherein each of said plurality of deployable arms and said fixed arm comprise a light, and wherein the lights of said deployable arms point in the same direction as the light of said fixed arm when said deployable arms are in said deployed position.

2. The deployable lighting system with device support of claim 1 further comprising a battery residing within said central body, said battery electrically coupled to said lights within said plurality of deployable arms.

3. The deployable lighting system with device support of claim 2 wherein said gripping clip comprises a first gripping arm and a second gripping arm, wherein said first gripping arm and said second gripping arm are extendable from each other, and wherein the extension of said first gripping arm from said second gripping arm is resisted by a spring.

4. The deployable lighting system with device support of claim 3 further comprising a pivot arm coupled to said central body, and wherein said gripping clip is rotatably coupled to the pivot arm around an axis perpendicular to said longitudinal main axis.

5. The deployable lighting system with device support of claim 2 further comprising a pivot arm coupled to said central body, and wherein said gripping clip is rotatably coupled to the pivot arm around an axis perpendicular to said longitudinal main axis.

6. The deployable lighting system with device support of claim 1 wherein said gripping clip comprises a first gripping arm and a second gripping arm, wherein said first gripping arm and said second gripping arm are extendable from each other, and wherein the extension of said first gripping arm from said second gripping arm is resisted by a spring.

7. The deployable lighting system with device support of claim 1 wherein said gripping clip is releasably coupled to said central body.

8. The deployable lighting system with device support of claim 1 further comprising a pivot arm coupled to said central body, and wherein said gripping clip is rotatably coupled to the pivot arm around an axis perpendicular to said longitudinal main axis.

9. A deployable lighting system with device support, said system comprising:
    a central body, said central body having a longitudinal main axis, said central body having a front side;
    a central disc pivotally coupled to an upper end of said central body, said central disc deployable from a stowed position perpendicular to said longitudinal main axis to a deployed position parallel to said longitudinal main axis;
    a plurality of deployable arm bases arms coupled around a periphery an upper end of said central body, said deployable arms releasably latched to a bottom end of said central body when said central disc is in the stowed position, said plurality of deployable arm bases arms deployable from a stowed position along said central body to a deployed position parallel forming an array of arm bases arms protruding radially outward from said central body;
    a non-releasable arm base coupled to the front side of said central body; and a gripping clip coupled to an upper end of said central body;
    wherein each of said plurality of deployable arm bases and said non-releasable arm base comprises a light.

10. The deployable lighting system with device support of claim 9 further comprising a battery residing within said central body, said battery electrically coupled to said lights within said plurality of deployable arms.

11. The deployable lighting system with device support of claim 10 wherein said gripping clip comprises a first gripping arm and a second gripping arm, wherein said first gripping arm and said second gripping arm are extendable from each other, and wherein the extension of said first gripping arm from said second gripping arm is resisted by a spring.

12. The deployable lighting system with device support of claim 11 further comprising a pivot arm coupled to said central body, and wherein said gripping clip is rotatably coupled to the pivot arm around an axis perpendicular to said longitudinal main axis.

13. The deployable lighting system with device support of claim 10 further comprising a pivot arm coupled to said central body, and wherein said gripping clip is rotatably coupled to the pivot arm around an axis perpendicular to said longitudinal main axis.

14. The deployable lighting system with device support of claim 9 wherein said gripping clip comprises a first gripping arm and a second gripping arm, wherein said first gripping arm and said second gripping arm are extendable from each other, and wherein the extension of said first gripping arm from said second gripping arm is resisted by a spring.

15. The deployable lighting system with device support of claim 9 further comprising a pivot arm coupled to said central body, and wherein said gripping clip is rotatably coupled to the pivot arm around an axis perpendicular to said longitudinal main axis.

16. The deployable lighting system with device support of claim 9 wherein each of said deployable arm bases comprise two light arms, wherein said light arms are rotatable from an end of said arm bases.

17. The deployable lighting system with device support of claim 16 wherein said non-releasable arm base comprises two light arms, wherein said light arms are rotatable from a lower end of said non-releasable arm base.

18. The deployable lighting system with device support of claim 17 wherein said gripping clip comprises a first gripping arm and a second gripping arm, wherein said first gripping arm and said second gripping arm are extendable from each other, and wherein the extension of said first gripping arm from said second gripping arm is resisted by a spring.

19. The deployable lighting system with device support of claim 17 wherein said light arms of said deployable arm bases and said non-releasable arm base rotate to form a ring of lights.

\* \* \* \* \*